United States Patent
Takano

(10) Patent No.: US 9,681,437 B2
(45) Date of Patent: *Jun. 13, 2017

(54) METHODS AND APPARATUS FOR COMMUNICATING RESOURCE INFORMATION IN A COMMUNICATION SYSTEM

(71) Applicant: Sony Corporation, Tokyo (JP)

(72) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 37 days.

This patent is subject to a terminal disclaimer.

(21) Appl. No.: 14/409,577

(22) PCT Filed: Apr. 18, 2013

(86) PCT No.: PCT/JP2013/061445
§ 371 (c)(1),
(2) Date: Dec. 19, 2014

(87) PCT Pub. No.: WO2014/002587
PCT Pub. Date: Jan. 3, 2014

(65) Prior Publication Data
US 2015/0195064 A1 Jul. 9, 2015

(30) Foreign Application Priority Data
Jun. 27, 2012 (JP) .................................. 2012-144049

(51) Int. Cl.
*H04B 7/00* (2006.01)
*H04W 72/04* (2009.01)
(Continued)

(52) U.S. Cl.
CPC ......... *H04W 72/044* (2013.01); *H04L 5/0007* (2013.01); *H04L 5/0048* (2013.01);
(Continued)

(58) Field of Classification Search
CPC ......... H04W 72/1215; H04W 72/1263; H04W 72/1278; H04W 72/14
(Continued)

(56) References Cited

U.S. PATENT DOCUMENTS

| 5,125,103 A | 6/1992 | Grube et al. |
| 7,548,758 B2* | 6/2009 | Periyalwar .......... H04W 52/383 370/324 |

(Continued)

FOREIGN PATENT DOCUMENTS

| JP | 2010-533443 A | 10/2010 |
| JP | 2012-005086 A | 1/2012 |

(Continued)

OTHER PUBLICATIONS

No Author Listed, Further Analysis on Time Domain Solutions in Het-Net, $3^{rd}$ Generation Partnership Project, 3GPP TSG RAN WG1 Meeting #62, R1-104345, Madrid, Spain , Aug. 17, 2010, 4 p.

(Continued)

*Primary Examiner* — Dmitry H Levitan
(74) *Attorney, Agent, or Firm* — Wolf, Greenfield & Sacks, P.C.

(57) ABSTRACT

Provided is a communication control device including a radio communication unit configured to perform radio communication with a terminal apparatus of a primary system using a frequency band of the primary system, and a selecting unit configured to select a subframe in which the frequency band is usable by a secondary system secondarily using the frequency band, the subframe being a unit of time in radio communication. The radio communication unit transmits system information of the frequency band including identification information of the selected subframe.

10 Claims, 25 Drawing Sheets

(51) Int. Cl.
| | |
|---|---|
| *H04W 16/06* | (2009.01) |
| *H04W 16/16* | (2009.01) |
| *H04L 5/00* | (2006.01) |
| *H04L 5/14* | (2006.01) |
| *H04L 12/18* | (2006.01) |
| *H04W 72/00* | (2009.01) |
| *H04W 76/02* | (2009.01) |

(52) U.S. Cl.
CPC ............ *H04L 5/14* (2013.01); *H04L 12/1881* (2013.01); *H04W 16/06* (2013.01); *H04W 16/16* (2013.01); *H04W 72/005* (2013.01); *H04W 72/042* (2013.01); *H04W 76/023* (2013.01)

(58) Field of Classification Search
USPC ................. 370/310, 315, 328–330, 431, 433
See application file for complete search history.

(56) References Cited

U.S. PATENT DOCUMENTS

| | | | | |
|---|---|---|---|---|
| 8,160,101 | B2* | 4/2012 | Kwak | H04B 7/2615 370/471 |
| 8,447,315 | B2* | 5/2013 | Hakola | H04W 72/085 455/447 |
| 8,452,240 | B2 | 5/2013 | Takahashi | |
| 8,533,370 | B2 | 9/2013 | Tanaka et al. | |
| 8,750,886 | B2* | 6/2014 | Hakola | H04W 72/042 455/450 |
| 8,767,616 | B2* | 7/2014 | Choi | G01S 19/03 370/312 |
| 8,811,359 | B2* | 8/2014 | Wang | H04W 72/0493 370/338 |
| 8,830,928 | B2* | 9/2014 | Iwamura | H04W 72/1278 370/252 |
| 8,848,591 | B2* | 9/2014 | Liu | H04W 4/06 370/280 |
| 8,995,942 | B2 | 3/2015 | Watanabe | |
| 9,084,241 | B2* | 7/2015 | Madan | H04W 72/0406 |
| 9,100,941 | B2* | 8/2015 | Ratasuk | H04W 76/023 |
| 9,480,053 | B2 | 10/2016 | Takano et al. | |
| 9,516,639 | B2 | 12/2016 | Takano | |
| 9,544,780 | B2 | 1/2017 | Takano | |
| 2007/0147310 | A1 | 6/2007 | Cai | |
| 2009/0268680 | A1* | 10/2009 | Nam | H04W 64/00 370/329 |
| 2010/0120424 | A1 | 5/2010 | Johansson et al. | |
| 2011/0076965 | A1 | 3/2011 | Takahashi | |
| 2011/0081870 | A1 | 4/2011 | Watanabe | |
| 2011/0106984 | A1 | 5/2011 | Tanaka et al. | |
| 2011/0255425 | A1 | 10/2011 | Pikkarainen et al. | |
| 2011/0255450 | A1 | 10/2011 | Wang et al. | |
| 2011/0275379 | A1 | 11/2011 | Hakola et al. | |
| 2011/0282989 | A1* | 11/2011 | Geirhofer | H04W 28/18 709/224 |
| 2012/0069803 | A1 | 3/2012 | Iwamura et al. | |
| 2013/0100893 | A1 | 4/2013 | Sawai | |
| 2013/0109384 | A1 | 5/2013 | Abe et al. | |
| 2013/0155962 | A1* | 6/2013 | Hakola | H04W 72/042 370/329 |
| 2013/0242924 | A1 | 9/2013 | Kim et al. | |
| 2014/0307685 | A1 | 10/2014 | Takano | |
| 2015/0110083 | A1 | 4/2015 | Takano | |
| 2015/0117348 | A1 | 4/2015 | Takano et al. | |
| 2015/0119064 | A1 | 4/2015 | Takano | |
| 2015/0139108 | A1* | 5/2015 | Takano | H04W 16/16 370/329 |
| 2015/0156006 | A1 | 6/2015 | Takano et al. | |
| 2016/0080135 | A1 | 3/2016 | Takano et al. | |
| 2016/0135157 | A1 | 5/2016 | Takano | |

FOREIGN PATENT DOCUMENTS

| | | |
|---|---|---|
| JP | 2012-034326 A | 2/2012 |
| JP | 2012-080509 A | 4/2012 |
| JP | 2013-530570 A | 7/2013 |
| WO | WO 2009/130592 A1 | 10/2009 |
| WO | WO 2010/027308 A1 | 3/2010 |
| WO | WO 2010/084987 A1 | 7/2010 |
| WO | WO 2010/143445 A1 | 12/2010 |
| WO | WO 2011-130626 A1 | 10/2011 |
| WO | WO 2011/136334 A1 | 11/2011 |
| WO | WO 2012/067006 A1 | 5/2012 |
| WO | WO 2012/067403 A2 | 5/2012 |

OTHER PUBLICATIONS

No Author Listed, Analysis of Time-Partitioning Solution for Control Channel, 3$^{rd}$ Generation Partnership Project, 3GPP TSG RAN WG1 Meeting #61bis, R1-103494, Dresden, Germany, Jun. 22, 2010, 3p.

No Author Listed, ABS signaling considerations for LTE-A TDD, 3$^{rd}$ Generation Partnership Project, 3GPP TSG RAN WG1 Meeting #63, R1-105940, Jacksonville, FL, Nov. 11, 2010, 4p.

Japanese Office Action mailed Jul. 5, 2016 in connection with Japanese Application No. 2014-522463.

Extended European Search Report issued Jan. 12, 2016 in connection with European Application No. 13809178.0.

Extended European Search Report issued Jan. 21, 2016 in connection with European Application No. 13810373.4.

International Preliminary Report on Patentability and English translation thereof mailed Jan. 8, 2015 in connection with Application No. PCT/JP2013/061275.

International Search Report and Written Opinion and English translation thereof dated May 21, 2013 in connection with Application No. PCT/JP2013/061275.

* cited by examiner

FIG. 23

METHODS AND APPARATUS FOR COMMUNICATING RESOURCE INFORMATION IN A COMMUNICATION SYSTEM

CROSS REFERENCE TO RELATED APPLICATIONS

The present application is a U.S. National Stage Application under 35 U.S.C. §371, based on International Application No. PCT/JP2013/061445, filed Apr. 18, 2013, which claims priority to Japanese Patent Application JP 2012-144049, filed Jun. 27, 2012, the entire contents of each of which is incorporated herein by reference.

TECHNICAL FIELD

The present disclosure relates to a communication control device, a communication control method, and a communication device.

BACKGROUND ART

High speed cellular radio communication schemes such as Long Term Evolution (LTE) and WiMAX have been put into practical use in recent years, remarkably increasing communication rates of radio communication services for mobile users. Furthermore, the introduction of the fourth generation cellular radio communication schemes such as LTE-Advanced (LTE-A) will be expected to increase communication rates much more.

Meanwhile, more and more applications that require high data rates are used with a rapid increase in the number of mobile users. As a result, the development of cellular radio communication schemes has not yet satisfied all the needs of mobile users. Accordingly, techniques for effective use of frequency resources are developed in order to maintain or increase communication rates.

For example, Patent Literature 1 discloses a technique for helping share communication resources between a plurality of secondary communication services.

CITATION LIST

Patent Literature

Patent Literature 1: JP 2012-34326A

SUMMARY OF INVENTION

Technical Problem

However, when communication resources in an idle state among communication resources of a primary system are effectively used, for example, even when a secondary system desires to use the communication resources in the idle state, communication resources that are actually in the idle state are obscure to the secondary system. For this reason, it is desirable that the primary system notify the secondary system of communication resources in the idle state, but depending on the notification technique, a load of the primary system may be increased, and it may be difficult for the secondary system to check the communication resources in the idle state.

In this regard, it is desirable to provide a mechanism in which the primary system efficiently notifies of communication resources in the idle state, and the secondary system can easily check the communication resources.

Solution to Problem

According to the present disclosure, there is provided a communication control device including a radio communication unit configured to perform radio communication with a terminal apparatus of a primary system using a frequency band of the primary system, and a selecting unit configured to select a subframe in which the frequency band is usable by a secondary system secondarily using the frequency band, the subframe being a unit of time in radio communication. The radio communication unit transmits system information of the frequency band including identification information of the selected subframe.

According to the present disclosure, there is provided a communication control method including performing radio communication with a terminal apparatus of a primary system using a frequency band of the primary system, selecting a subframe in which the frequency band is usable by a secondary system secondarily using the frequency band, the subframe being a unit of time in radio communication, and transmitting system information of the frequency band including identification information of the selected subframe.

According to the present disclosure, there is provided a communication device including a radio communication unit configured to, when a communication control device performing radio communication with a terminal apparatus of a primary system using a frequency band of the primary system selects a subframe in which the frequency band is usable by a secondary system secondarily using the frequency band, receive system information of the frequency band including identification information of the selected subframe, the subframe being a unit of time in radio communication, and a control unit configured to cause the radio communication unit to perform radio communication using the frequency band within the subframe identified by the identification information.

Advantageous Effects of Invention

As described above, according to the present disclosure, the primary system can efficiently notify of communication resources in the idle state, and the secondary system can easily check the communication resources.

BRIEF DESCRIPTION OF DRAWINGS

FIG. 23 is an explanatory diagram for describing examples of a downlink reception timing and an uplink transmission timing at a UE side in each TDD configuration.

DESCRIPTION OF EMBODIMENTS

Figure 1:
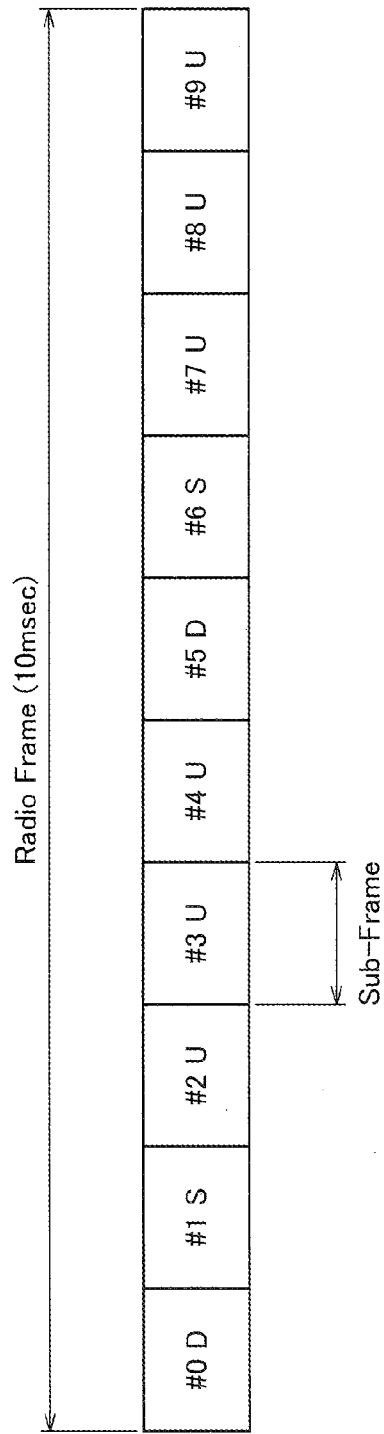
FIG. 1 is an explanatory diagram for describing an exemplary format of a radio frame of a TDD.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The description will proceed in the following order.
1. Introduction
  1.1. Technical field of effective use of frequency resources
  1.2. Frequency secondary use for effectively using frequency resources in idle state
  1.3. Primary system and secondary system
  1.4. FDD/TDD in LTE
  1.5. Technical problems
2. Schematic configurations of primary system and secondary system
3. First Embodiment
  3.1. Overview
  3.2. Configuration of eNodeB
  3.3. Configuration of home eNodeB
  3.4. Configuration of UE
  3.5. Processing flow
  3.6. Modified example
4. Second Embodiment
  4.1. Overview
  4.2. Configuration of eNodeB
  4.3. Configuration of home eNodeB
  4.4. Processing flow
5. Third Embodiment
  5.1. Overview
  5.2. Configuration of eNodeB
  5.3. Processing flow
6. Conclusion <<1. Introduction>>

First, the technical field of effective use of frequency resources, a frequency secondary use for effectively using frequency resources in a temporally or spatially idle state, a primary system and a secondary system, an FDD/TDD in LTE, and a technical problem will be described.

<1.1. Technical Field for Effective Use of Frequency Resource>

First of all, the technical field for effective use of a frequency resource will be described. For example, the following technical fields are representative of the technical field for effective use of a frequency resource.

frequency sharing within a single operator
  frequency sharing between different operators
  frequency secondary use for effectively using a frequency resource in a temporally or spatially idle state
  real-time auction of a frequency resource in an idle state First, frequency sharing within a single operator is a technique of improving utilization efficiency of a frequency resource with the frequency resource leased between communication systems of the same operator in different communication schemes. The different communication schemes are Wideband Code Division Multiple Access (W-CDMA) and Long Term Evolution (LTE) as an example. For example, a rapidly increased traffic volume in a LTE network and a small traffic volume in a W-CDMA network temporarily allow a part of the frequency resource in the W-CDMA network to be used in the LTE network. As a result, it becomes possible to increase the communication capacity of the LTE network, which leads to an increase in the total traffic volumes of both W-CDMA network and LTE network. In other words, it becomes possible to increase the number of terminal apparatuses that can be accommodated in both W-CDMA network and LTE network.

Second, frequency sharing between different operators is a technique of improving utilization efficiency of a frequency resource with the frequency resource leased between communication systems of the different operators. It is assumed in this frequency sharing that different operators (such as an operator A and an operator B) are concurrently providing radio communication services in the same area. For example, the operator A and the operator B each provide a radio communication service of LTE. For example, a rapidly increased traffic volume in a LTE network of the operator B and a small traffic volume in a LTE network of the operator A temporarily allow a part of the frequency resource in the LTE network of the operator A to be used in the LTE network of the operator B. As a result, it becomes possible to increase the communication capacity of the LTE network of the operator B, which leads to an increase in the traffic volume in the LTE network of the operator B.

Third, frequency secondary use for efficiently using a frequency resource in a temporally or spatially idle state is a technique of improving utilization efficiency of a frequency resource with the frequency resource leased between a primary system and a secondary system. The primary system is also referred to as primary system. The secondary system is also referred to as secondary system. The primary system is a main system having priority. For example, the primary system is a radio communication system of LTE. For example, the secondary system is a dedicated radio communication system of LTE including a radio LAN system or a home eNodeB and a User Equipment (UE) in the neighborhood thereof. For example, when the primary system has a frequency resource unused, the secondary system temporarily uses this frequency resource.

Fourth, the real-time auction of frequency resources in the idle state is a technique of lending frequency resources to an operator who desires to use the frequency resources in the idle state through an auction.

The present disclosure focuses on the frequency secondary use for effectively using the frequency resources in the temporally or spatially idle state. In the present disclosure, for example, a technique necessary when this technique is applied in an LTE platform will be described.

<1.2. Frequency Secondary Use for Effectively Using Frequency Resources in Idle State>

(Premise of Frequency Secondary Use in LTE)

In the LTE radio communication system, resource blocks (RBs) are uplink and downlink scheduling units. The resource blocks are communication resources of 12 sub carriers×7 OFDM symbols. The communication resources can be divided in the frequency direction and the time direction as described above. User equipment (UE) can use communication resources of resource block units. Further, downlink and uplink communication resources are allocated to the UE in units of resource blocks In the LTE radio communication system, not all resource blocks are necessarily used all the time. In other words, when the number of UEs in a cell is small or when uplink or downlink traffic of the UE is small, there are resource blocks in the idle state. When the communication resources in the idle state are released by the primary system and effectively used by the secondary system, throughput can be improved.

(Units of Communication Resources to be Effectively Used)

As described above, the resource blocks that are the communication resources of 12 sub carriers×7 OFDM symbols have been described as the communication resources in the idle state. The resource block is a minimum scheduling unit. As a first example, units of the communication resources in the idle state released to the secondary system are the resource blocks. As a second example, units of the communication resources in the idle state released to the secondary system are subframes. In other words, communication resources of a frequency band (for example, component carrier)×1 millisecond (ms) are released to the secondary system.

The frequency at which release of communication resources is decided is considered to differ according to units of released communication resources in the idle state.

For example, when units of released communication resources in the idle state are resource blocks, the frequency at which the release is decided may be very high. In other words, the communication resources in the idle state may be very dynamically released. This is because, since a UE using a resource block is decided for each resource block, a resource block directly after a resource block in the idle state may not be in the idle state. Thus, for example, the frequency at which the release of the resource block is decided is 1 ms (a length of a subframe).

Meanwhile, for example, when units of released communication resources in the idle state are subframes, the frequency at which the release is decided may be low. In other words, the communication resources in the idle state may be released semi-statically. For example, the frequency at which the release of communication resources of subframe units is decided is several periods of 10 ms. In this case, communication resources of subframe units released in a radio frame of 10 ms are used by the secondary system during several periods of 10 ms.

The present disclosure is focused on the release of communication resources of subframe units.

<1.3. Primary System and Secondary System>

(Overview)

Next, a common primary system and a common secondary system will be described. The primary system is a system having a priority for use of communication resources. Meanwhile, the secondary system is a system using communication resources in the idle state under conditions of having no influence on the primary system when there are communication resources in the idle state among communication resources of the primary system. Thus, the primary system has priority over the secondary system. The primary system and the secondary system may use different radio access techniques.

(Example of Primary System and Secondary System)

For example, the primary system is an LTE radio communication system.

Meanwhile, for example, the secondary system is a wireless LAN communication system. As another example, the secondary system may be a radio communication system including UEs of LTE operating in a P2P mode. Further, as another example, the secondary system may be a radio communication system including an independent eNodeB (for example, a home eNodeB or a Pico eNodeB) and a UE communicating with the eNodeB.

(Relation Between Primary System and Secondary System in LTE)

As described above, the primary system is high in priority, and the secondary system is low in priority. In this case, it is difficult to imagine the secondary system transmitting a certain signal to the primary system. In other words, it is difficult to imagine the secondary system transmitting an inquiry to the primary system about the communication resources in the idle state. This is because such an inquiry may increase a load of the primary system. Generally, the secondary system does not perform transmission and reception of signals with the primary system, but independently determines communication resources of the primary system in the idle state and uses the determined communication resources without influencing the primary system. Here, when the secondary system has influence on the primary system, for example, it means that a signal transmitted by the secondary system using the communication resources serves as an interference source to the primary system and thus the throughput of the primary system is lowered.

Further, when the primary system is an LTE radio communication system, since the radio communication system is a system of a cellular scheme, a certain cell in the primary system neighbors another cell in the primary system. In this case, when there are communication resources in the idle state in a certain cell, and the secondary system uses the communication resources, it is desirable to consider that a transmission signal of the secondary system may serve as an interference source to a neighboring cell.

As described above, generally, transmission and reception of signals are not performed between the primary system and the secondary system according to the related art. For this reason, the secondary system measures radio waves of the primary system during a sufficiently long period of time, and then determines whether or not communication resources are being used in the primary system (that is, whether or not there are communication resources in the idle state). Then, when it is determined that there are communication resources in the idle state, the secondary system uses the communication resources considered to be in the idle state.

<1.4. FDD/TDD in LTE>

Here, frequency division duplex (FDD) and time division duplex (TDD) in the LTE radio communication system will be described. In LTE, both FDD and TDD can be employed. In FDD, an uplink dedicated frequency band and a downlink dedicated frequency band are used in the frequency direction. Further, in FDD, a format of a radio frame including 10 subframes is used in the time direction. Meanwhile, a format of a radio frame including 10 subframes is used in the time direction in TDD as well. However, in TDD, the same frequency band is used in both of uplink communication and downlink communication. A format of a radio frame of TDD will be specifically described below with reference to FIG. 1.

FIG. 1 is an explanatory diagram for describing an exemplary format of a radio frame of TDD. Referring to FIG. 1, a radio frame is a unit of time in LTE, and has a length of 10 ms. Further, one radio frame includes 10 subframes. A subframe is also a unit of time in LTE, and has a length of 1 ms. In TDD, a link direction is set for each subframe. For example, in the radio frame illustrated in FIG. 1, a downlink direction is set as a link direction of a subframe #0, and an uplink direction is set as a link direction of a subframe #3.

Here, the uplink refers to communication from a UE to an eNodeB, and the downlink refers to communication from an eNodeB to a UE. In FIG. 1, D, U, and S indicate a downlink subframe, an uplink subframe, and a special subframe, respectively. The special subframe will be described later.

In the radio communication system complying with LTE, FDD is commonly employed. However, TDD has several merits over FDD.

For example, TDD has a merit from a point of view of securing a frequency band. In FDD, a pair of an uplink frequency band and a downlink frequency band have to be secured, whereas in TDD, only one frequency band has to be secured.

Further, for example, TDD has a merit from a point of view of a ratio of the uplink and the downlink. For example, in FDD, when an uplink frequency band of 20 MHz and a downlink frequency band of 20 MHz are secured, a ratio of uplink communication resources and downlink communication resources is fixed to 1:1. Meanwhile, in TDD, when a frequency band of 20 MHz is secured, a ratio of uplink communication resources and downlink communication resources is variable. In other words, in TDD, it is possible to change a ratio of uplink communication resources and downlink communication resources by changing a configuration (hereinafter, "TDD configuration") of a link direction of each subframe in a radio frame.

Due to the above-mentioned merits, TDD is expected to be increasingly employed in radio communication systems complying with LTE or LTE-Advanced.

Further, although TDD has the above-mentioned merits, it is necessary to secure a time for switching between the downlink and the uplink. To this end, in TDD, a special subframe is inserted between a downlink subframe and an uplink subframe. The special subframe will be specifically described below with reference to FIG. 2.

Figure 2:
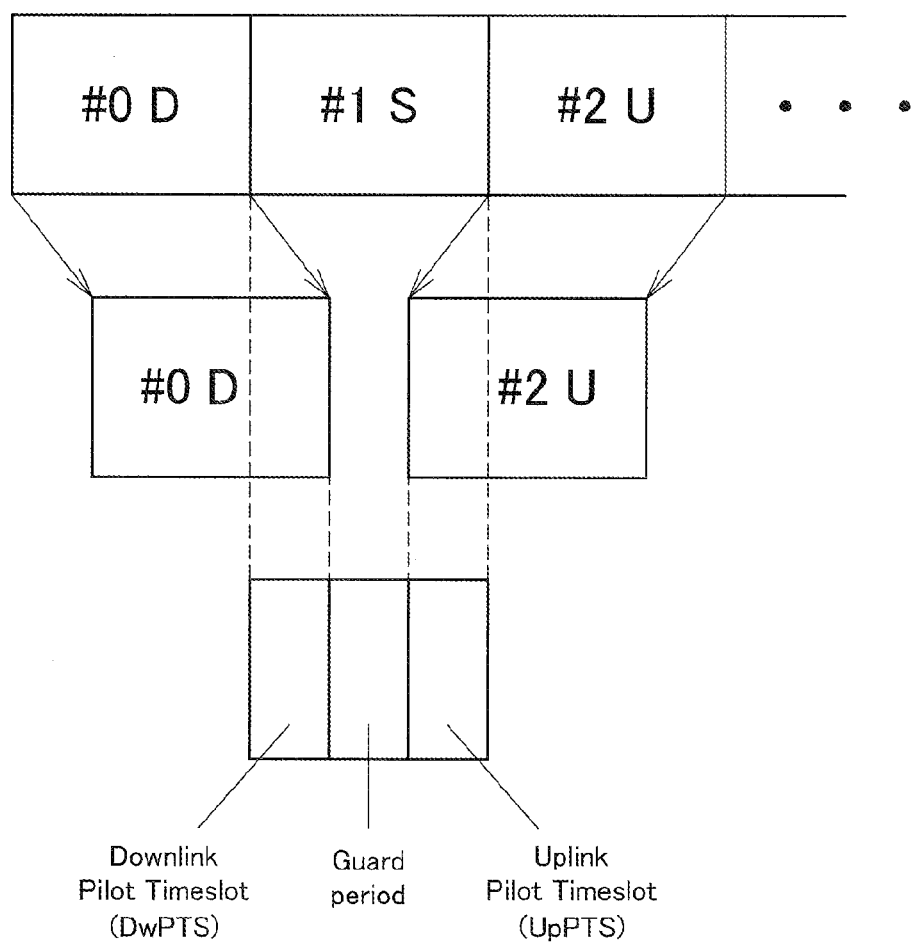
FIG. 2 is an explanatory diagram for describing an exemplary special subframe included in a radio frame of a TDD.

FIG. 2 is an explanatory diagram for describing an exemplary special subframe included in a radio frame complying with TDD. Referring to FIG. 2, subframes #0 to #2 in the radio frame illustrated in FIG. 1 are illustrated. Here, the subframe #0 is the downlink subframe, the subframe #1 is the special subframe, and the subframe #2 is the uplink subframe. According to a point of view of an eNodeB, a time at which the UE receives a downlink signal of the subframe #0 is delayed from a time of the subframe #0 in the format due to a spatial propagation delay or a processing device in the UE. Further, in order to cause data to arrive at the eNodeB at a time of the subframe #2 in the format, the UE has to transmit an uplink signal in advance. Thus, the special subframe is defined as a region to gain a time corresponding to a delay in the downlink and an accelerated time in the uplink. In other words, the special subframe includes a downlink pilot time slot (DwPTS) and an uplink pilot time slot (UpPTS). The special subframe further includes a guard period. As described above, inserting the special subframe at the time of switching between the downlink and the uplink is a disadvantage of TDD.

<1.5. Technical Problems>

Technical problems when the frequency secondary use of effectively using the frequency resources in the temporally or spatially idle state described above is implemented will be described. Here, communication resources of subframe units are assumed to be released. The description will proceed with an example in which the above-described frequency secondary use is implemented on, for example, an LTE or LTE-A platform.

As described above, transmission and reception of signals are not generally performed between the primary system and the secondary system according to the related art. For this reason, the secondary system measures radio waves of the primary system during a sufficiently long period of time, and then determines whether or not communication resources are being used in the primary system (that is, whether or not there are communication resources in the idle state). Then, when it is determined that there are communication resources in the idle state, the secondary system uses the communication resources considered to be in the idle state.

However, in this technique of the related art, communication resources that are actually in the idle state are not known by the secondary system. More specifically, the technique of determining the communication resources in the idle state through the measuring of the secondary system carries a risk because communication of the primary system may start directly after the determining, and thus it is difficult to accurately specify the communication resources that are actually in the idle state. Further, in this technique, since measurement takes a long time, it is difficult to specify the communication resources in the idle state that become available in a period shorter than a period of time necessary for the measurement.

Thus, when the LTE radio communication system is the primary system and the communication resources of the primary system are secondarily used, it is desirable that the secondary system notify the secondary system of the communication resources in the idle state. As the notifying technique, a technique of notifying the secondary system of the communication resources in the idle state using an LTE radio access of the primary system is considered. This is because a technique in which an eNodeB of the primary system gives a notification to the secondary system via a core network (and the Internet) is considered to take a long time and be unable to efficiently release the communication resources in the idle state. Here, depending on the notification technique, a load of the primary system may be increased, and it may be difficult for the secondary system to check the communication resources in the idle state.

In this regard, in an embodiment of the present disclosure, the primary system can efficiently notify of communication resources in the idle state, and the secondary system can easily check the communication resources. Next, specific content of <<2. Schematic configuration of primary system and secondary system>>, <<3. First embodiment>>, <<4. Second embodiment>>, and <<5. Third embodiment>> will be described.

<<2. Schematic Configurations of Primary System and Secondary System>>

Figure 3:
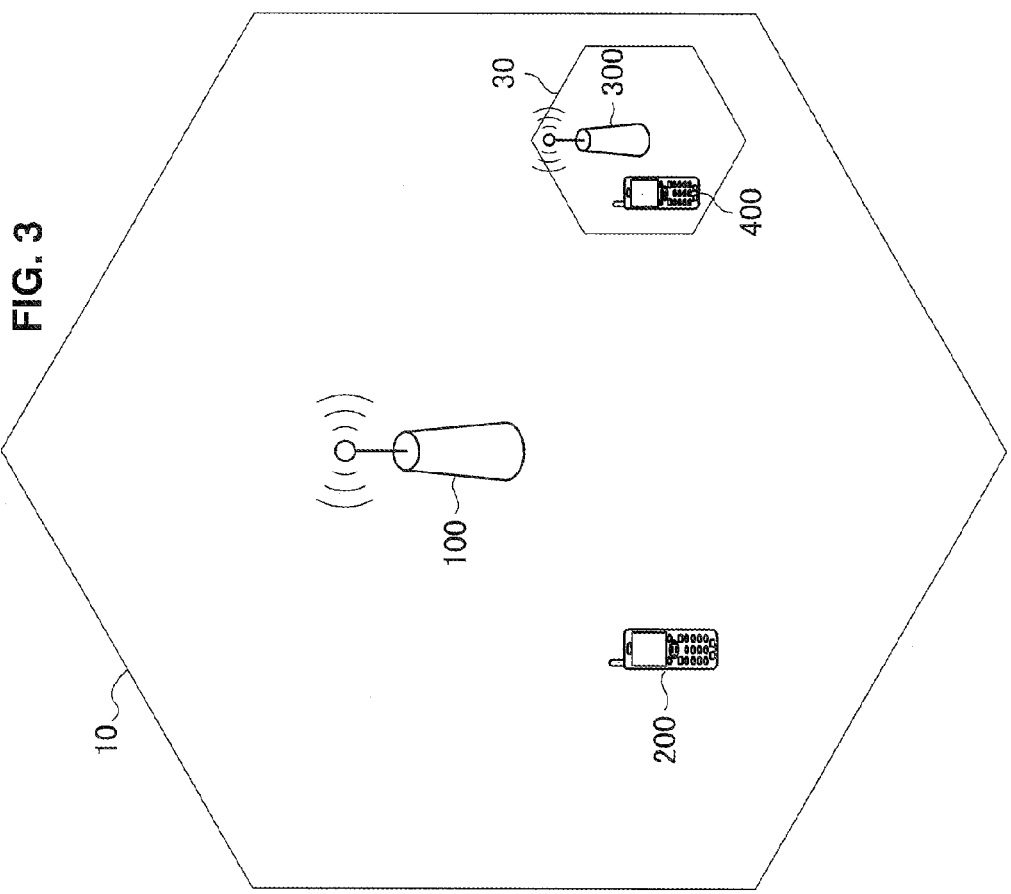
FIG. 3 is an explanatory diagram illustrating exemplary schematic configurations of a primary system and a secondary system according to an embodiment of the present disclosure.

First, schematic configurations of a primary system and a secondary system according to an embodiment of the present disclosure will be described with reference to FIG. 3. FIG. 3 is an explanatory diagram illustrating exemplary schematic configurations of a primary system and a secondary system according to an embodiment of the present disclosure. Referring to FIG. 3, a primary system including an eNodeB 100 and a UE 200 and a secondary system including a home eNodeB 300 and a UE 400 are illustrated. As described above, the primary system and the secondary system are LTE or LTE-A radio communication systems, for example.

(Primary System)

For example, the primary system includes the eNodeB 100 and the UE 200 as described above. The eNodeB 100 performs radio communication with the UE 200 using a frequency band of the primary system in a cell 10 of the primary system. For example, the frequency band is a component carrier (CC). The CC has a bandwidth of a maximum of 20 MHz.

The eNodeB 100 performs radio communication with the UE 200 in units of time in radio communication. A unit of time in radio communication is a radio frame of 10 ms. Further, since a radio frame includes 10 subframes, a unit of time in radio communication is also referred to as a subframe of 1 ms.

The eNodeB 100 performs uplink and downlink scheduling in units of resource blocks. In other words, the eNodeB 100 allocates uplink communication resources and downlink communication resources in units of resource blocks to the UE 200. A CC includes a maximum of 110 resource blocks in the frequency direction, and a subframe includes 2 resource blocks in the time direction. In other words, a CC includes a maximum of 220 resource blocks for each subframe.

(Secondary System)

For example, the secondary system includes the home eNodeB 300 and the UE 400 as described above. The secondary system secondarily uses the frequency band of the primary system. In other words, the home eNodeB 300 performs communication with the UE 400 using communication resources in the idle state which are not used in the primary system. Particularly, in an embodiment of the present disclosure, communication resources of subframe units. In other words, the home eNodeB 300 performs communication with the UE 400 using a CC within a subframe in which the <<3. First Embodiment>>

<3.1. Overview>

Next, a first embodiment of the present disclosure will be described. In the first embodiment, the primary system selects a subframe in which a frequency band is usable by the secondary system. Then, the primary system transmits the system information including identification information of the selected subframe. In other words, the primary system transmits identification information of a subframe in which a frequency band is usable by the secondary system as part of the system information.

In the LTE radio communication system, as a technique in which an eNodeB transmits control information, there are three types of techniques, that is, a first transmission technique of transmitting control information through the PDCCH, a second transmission technique of transmitting control information through RRC signaling of the PDSCH, and a third transmission technique of transmitting control information as part of the system information.

First, in the first transmission technique, waste of communication resources is large. The PDCCH is a channel used to transmit information related to control of each resource block. For this reason, when semi-static information indicating a subframe in which communication resources are released is transmitted through the PDCCH, waste of communication resources is large.

Further, in the second transmission technique, it is not east for the secondary system to check available communication resources. For notification through RRC signaling, it is necessary to connect the communication device of the secondary system in an RRC_Connected state through synchronization in a frequency band and several control processes in random access channel (RACH) in the primary system. Thus, it is difficult or inconvenient for the secondary system to receive information through RRC signaling.

Meanwhile, in the third transmission technique, there is no waste of communication resources as in the first transmission technique. In other words, since the system information is transmitted for each frequency band, it is suitable for transmission of semi-static information indicating a subframe in which communication resources are released (that is, a subframe in which a frequency band is released). Further, there is no difficulty or inconvenience for the secondary system as in the second transmission technique. In other words, since the system information is information that can be checked after synchronization in a frequency band, the secondary system can easily check the system information.

Thus, as described above, the primary system transmits identification information of a subframe in which a frequency band is usable by the secondary system as part of the system information.

Further, in the first embodiment, in order to release communication resources of a selected subframe, the primary system sets the subframe as a certain type of subframe.

<3.2. Configuration of eNodeB>

Figure 4:
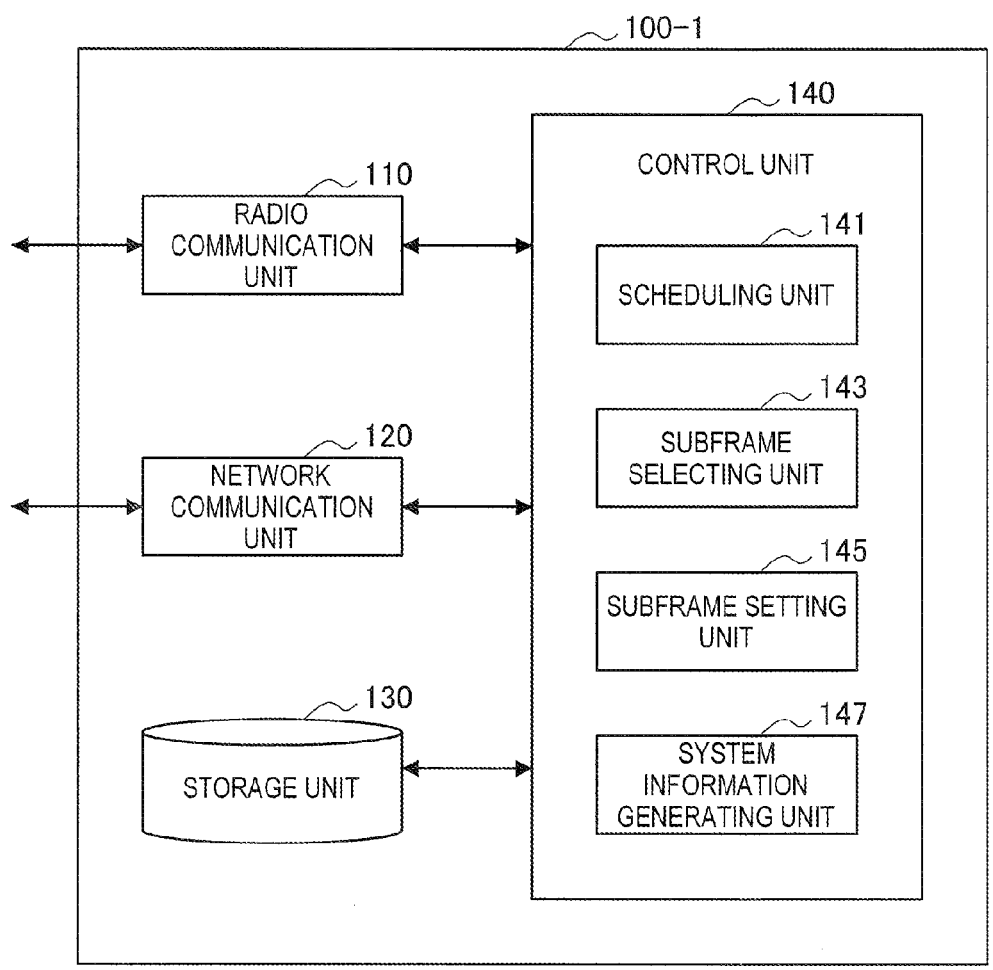
FIG. 4 is a block diagram illustrating an exemplary configuration of an eNodeB of a primary system according to a first embodiment.

An exemplary configuration of the eNodeB 100-1 of the primary system according to the present embodiment will be described with reference to FIGS. 4 to 9. FIG. 4 is a block diagram illustrating an exemplary configuration of the eNodeB 100-1 of the primary system according to the present embodiment. Referring to FIG. 4, the eNodeB 100-1 includes a radio communication unit 110, a network communication unit 120, a storage unit 130, and a control unit 140.

(Radio Communication Unit 110)

The radio communication unit 110 performs radio communication with the UE 200 of the primary system using the frequency band of the primary system. For example, the frequency band is a component carrier (CC) having a bandwidth of a maximum of 20 MHz. Further, the radio communication unit 110 performs communication with the UE 200 using the CC in units of times in the radio communication in the time direction, that is, in units of radio frames of 10 ms (or subframes of 1 ms).

Further, for example, as will be described later, when a subframe in which a frequency band is usable by the secondary system is selected by the control unit 140 (a subframe selecting unit 143), the radio communication unit 110 transmits the system information of the frequency band including the identification information of the selected subframe. The radio communication unit 110 transmits the system information through a physical broadcast channel (PBCH) and a physical downlink shared channel (PDSCH).

For example, the radio communication unit 210 includes an antenna and an RF circuit.

(Network Communication Unit 120)

The network communication unit 120 communicates with other communication nodes. For example, the network communication unit 120 communicates with the home eNodeB 300 of the secondary system directly or a certain communication node.

(Storage Unit 130)

The storage unit 130 stores a program and data that are necessary for an operation of the eNodeB 100. For example, the storage unit 130 includes a storage medium such as a hard disk or a semiconductor memory.

(Control Unit 140)

The control unit 140 provides various kinds of functions of the eNodeB 100-1. For example, the control unit 140 corresponds to a processor such as a CPU or a DSP, and executes a program stored in the storage unit 130 or any other storage medium to provide various kinds of functions. The control unit 140 includes a scheduling unit 141, a subframe selecting unit 143, a subframe setting unit 145, and a system information generating unit 147.

(Scheduling Unit 141)

The scheduling unit 141 performs uplink and downlink scheduling. For example, the scheduling unit 141 performs the scheduling in units of resource blocks. In other words, the eNodeB 100 allocates uplink communication resources and downlink communication resources in units of resource blocks to the UE 200.

Further, for example, as will be described later, when a subframe in which a frequency band is usable by the secondary system is selected by the subframe selecting unit 143, the scheduling unit 141 does not perform scheduling of communication resources of the selected subframe. In other words, the scheduling unit 141 does not allocate the resource blocks of the selected subframe to any UE 200.

(Subframe Selecting Unit 143)

The subframe selecting unit 143 selects a subframe in which the frequency band is usable by the secondary system. For example, the subframe selecting unit 143 selects a subframe in which the frequency band is usable by the secondary system based on the utilization state of the frequency band. An example of selecting a subframe when FDD is employed in the primary system and an example of selecting a subframe when TDD is employed in the primary system will be described.

First, when FDD is employed in the primary system, the frequency band is used in either of the downlink and the uplink. In this case, for example, the subframe selecting unit 143 determines the number of subframes in which communication resources can be released among the 10 subframes included in the radio frame based on the utilization state of the frequency band. Then, the subframe selecting unit 143 selects the determined number (or a number smaller than the determined number) of subframes from among the 10 subframes included in the radio frame.

Further, when TDD is employed in the primary system, each subframe is either of a downlink subframe and an uplink subframe. The frequency band is used for the downlink in the downlink subframe, and used for the uplink in the uplink subframe. In this case, for example, the subframe selecting unit 143 determines the number of downlink subframes in which communication resources can be released among downlink subframes included in the radio frame based on the utilization state of the frequency band in the downlink. Then, the subframe selecting unit 143 selects the determined number (or a number smaller than the determined number) of downlink subframes from among the downlink subframes included in the radio frame. Similarly, for example, the subframe selecting unit 143 determines the number of uplink subframes in which communication resources can be released among uplink subframes included in the radio frame based on the utilization state of the frequency band in the uplink. Then, the subframe selecting unit 143 selects the determined number (or a number smaller than the determined number) of uplink subframes from among the uplink subframes included in the radio frame.

Further, when the primary system is the radio communication system of the TDD scheme, for example, the subframe selecting unit 143 selects the uplink subframe preferentially over the downlink subframe as the subframe in which the frequency band is usable by the secondary system. As will be described later, when the uplink subframe is selected, the secondary system can use more communication resources than when the downlink subframe is selected. Thus, the communication resources can be more effectively used. Further, when the uplink subframe is selected, the primary system need not perform a setting of a subframe which will be described later. Thus, the load of the primary system can be reduced.

For example, the utilization state of the frequency band is an actual value or an estimation value of at least one of the number of UEs that are in a connection state with a frequency band, the sum of the number of UEs and the number of UEs that desire a connection with a frequency band, a utilization rate of communication resources in a frequency band, and a traffic volume in a frequency band, or a value derived from the actual value or the estimation value.

The subframe selecting unit 143 generates the identification information of the selected subframe. As a first example, identification information of a subframe may be 10-bit information, and each of 10 bits may indicate whether or not communication resources of one subframe included in a radio frame are released. As a second example, among subframes included in a radio frame, a subframe in which communication resources are released may be decided in advance according to the number of subframes. Further, the identification information of a subframe may be multi-bit information, and the multiple bits may indicate the number of subframes in which communication resources are released. As a third example, a plurality of patterns (for example, 7 patterns) of a subframe in which communication resources are released among 10 subframes may be decided in advance. Furthermore, the identification information of a subframe may be multi-bit information (for example, 3-bit information) uniquely identifying any one of the plurality of patterns.

(Subframe Setting Unit 145)

The subframe setting unit 145 sets a selected subframe as a certain type of subframe that is not used in downlink unicast transmission. For example, the subframe setting unit 145 sets a selected subframe as a multicast-broadcast single frequency network (MBSFN) subframe. More specifically, when a target frequency band is a downlink frequency band of the primary system or when a subframe to be selected is a downlink subframe of the primary system, the subframe setting unit 145 sets a selected subframe as an MBSFN subframe. In other words, when FDD is employed in the primary system, the subframe setting unit 145 sets a selected subframe as an MBSFN subframe for the downlink frequency band. Further, when TDD is employed in the primary system, the subframe setting unit 145 sets a selected downlink subframe as an MBSFN subframe. As an MBSFN subframe is set, the secondary system can use more communication resources within a subframe. This point will be specifically described below with reference to FIG. 5.

Figure 5:
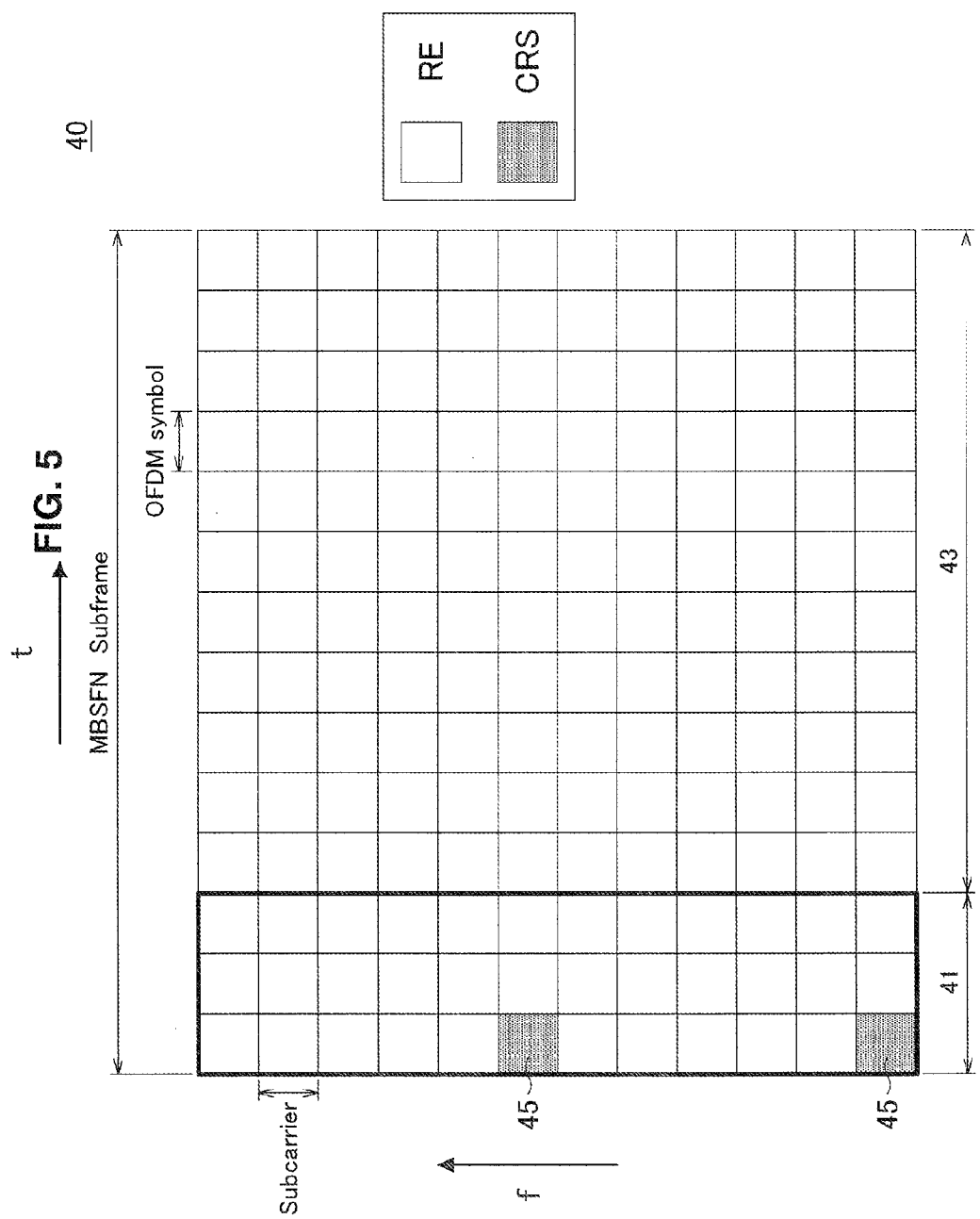
FIG. 5 is an explanatory diagram for describing exemplary communication resources of an MBSFN subframe.

FIG. 5 is an explanatory diagram for describing exemplary communication resources of an MBSFN subframe. Referring to FIG. 5, communication resources 40 divided in the frequency direction (f) and the time direction (t) are illustrated as communication resources in an MBSFN subframe. 12 sub carriers are illustrated in the frequency direction. 1 subframe (that is, 14 OFDM symbols) is illustrated in the time direction. In other words, 12×14 resource elements (REs) are illustrated, and two resource blocks (RB) are illustrated side by side in the time direction. A region 41 of the communication resources 40 is a region corresponding to the PDCCH in a normal subframe, and a region 43 of the communication resources 40 is a region corresponding to the PDSCH in a normal subframe. In the MBSFN subframe, the UE 200 receives a common reference signal (CRS) 45 in the region 41 corresponding to the PDCCH in the normal subframe.

Even when data directed to its own device is not received, the UE 200 receives the signal of the PDCCH (the region 41) and the CRS of the PDSCH (the region 43) within the normal subframe. Meanwhile, when an MBSFN subframe is set as a subframe, the UE 200 that is not an MBSFN target is configured to receive only the CRS 45 of the PDCCH within the MBSFN subframe. Thus, as an MBSFN subframe is set as a selected subframe, and any of the UE 200 of the primary system is not set as an MBSFN target for the subframe, the UE 200 of the primary system does not receive a signal other than the CRS 45 of the PDCCH (the region 41) within the subframe. As a result, the secondary system can use communication resources excluding communication resources corresponding to the CRS 45 of the PDCCH within the selected subframe. Thus, compared to the technique in which scheduling of a selected subframe is simply not performed, the secondary system can use more communication resources.

The setting of an MBSFN subframe as a subframe may be performed after a subframe is selected or before a subframe is selected.

The release of communication resources by the setting of the MBSFN subframe has been described, but there is a constraint on the release of communication resources. More specifically, a subframe settable as an MBSFN subframe is limited to a specific subframe among the 10 subframes included in the radio frame. Thus, communication resources of the specific subframe are a release target. For example, when FDD is employed in the primary system, setting an MBSFN subframe as the subframes #0, #4, #5, and #9 is inhibited. Thus, in this case, communication resources of the subframes #1, #2, #3, #6, #7, and #8 are a release target. Further, a synchronous signal is transmitted through the subframes #0 and #5. Further, when TDD is employed in the primary system, setting an MBSFN subframe as the subframes #0, #1, #2, #5, and #6 is inhibited. Thus, in this case, communication resources of the subframes #3, #4, #7, #8, and #9 are a release target. Further, a synchronous signal is transmitted through the subframes #0, #1, #5, and #6. The subframe #1 is the special subframe, the front half (variable) of which is partially transmitted.

Further, when an MBSFN subframe is set as a selected subframe, a notification indicating that the subframe is the MBSFN subframe is given to the UE 200 (that is, the UE 200 of RRC_Connected) belonging to the eNodeB 100-1 of the primary system. For example, information for notifying that the selected subframe is the MBSFN subframe is included in the system information. Through this notification, it is guaranteed that no signal other than the CRS 45 of the PDCCH is received by the UE 200 within the selected subframe.

Further, in order to prevent interference between the primary system and the secondary system, some communication resources in the subframe are not used by the secondary system.

As a first example, within the selected subframe, communication resources close to communication resources of a reference signal in the frequency direction and the time direction are not used by the secondary system. This point will be specifically described below with reference to FIG. 6.

Figure 6:
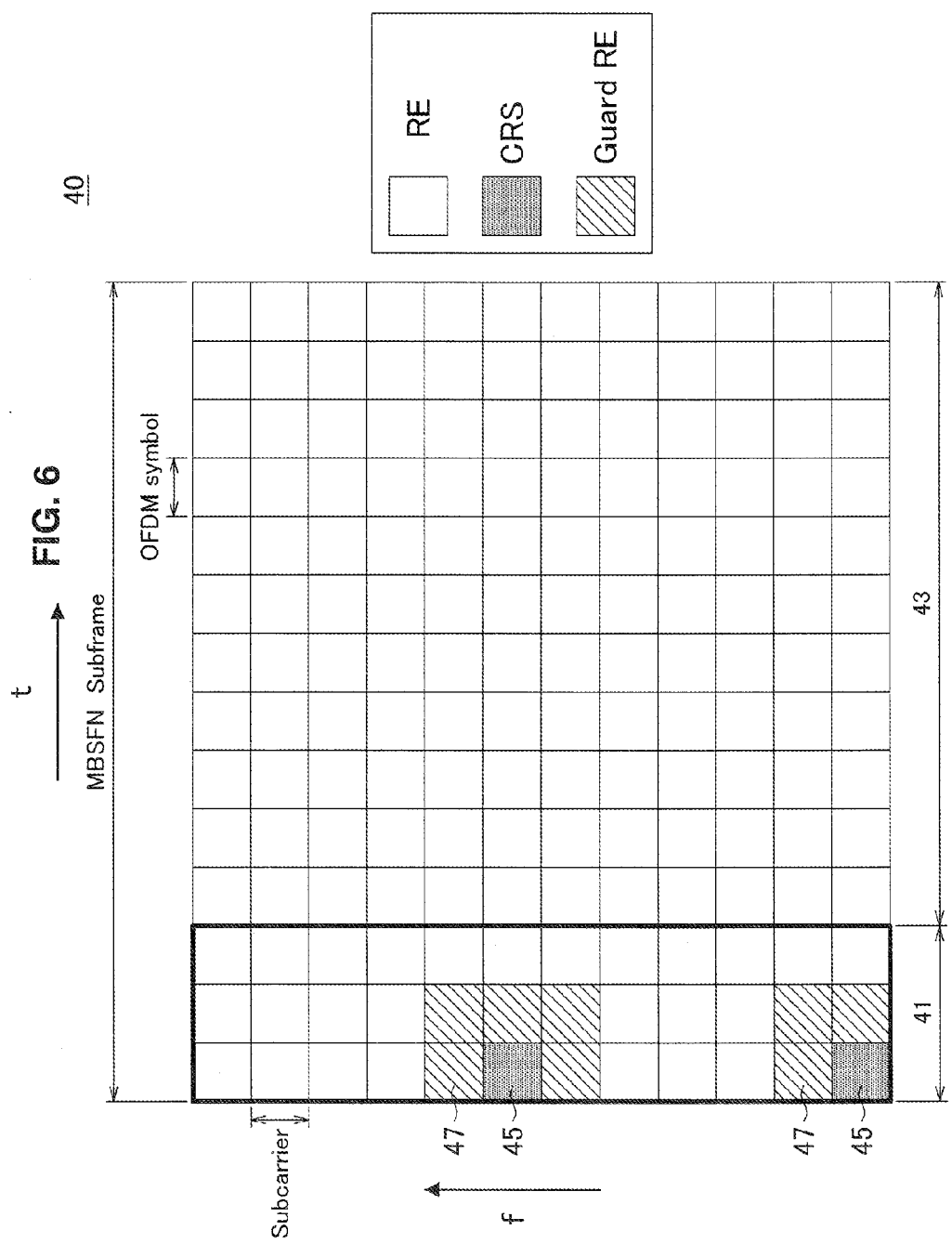
FIG. 6 is an explanatory diagram for describing a first example of a guard region in an MBSFN subframe.

FIG. 6 is an explanatory diagram for describing a first example of a guard region in an MBSFN subframe. Referring to FIG. 6, a region 47 around communication resources corresponding to the CRS 45 serves as a guard region. In other words, the secondary system does not use communication resources of the guard region 47, and uses communication resources other than communication resources of the guard region 47 and communication resources corresponding to the CRS 45.

As the communication resources are used as described above, the UE 200 of the primary system can receive the CRS 45 with little interference.

As a second example, when a subframe directly before a selected subframe is not selected by the subframe selecting unit 143, the frequency band is not used within the selected subframe by the secondary system until a certain period of time elapses after a start point of the subframe. In addition/alternatively, when a subframe directly before a selected subframe is not selected by the subframe selecting unit 143, the frequency band is not used within the selected subframe by the secondary system from a predetermined time before an end point in time of the subframe to the end point in time. This point will be specifically described below with reference to FIG. 7.

Figure 7:
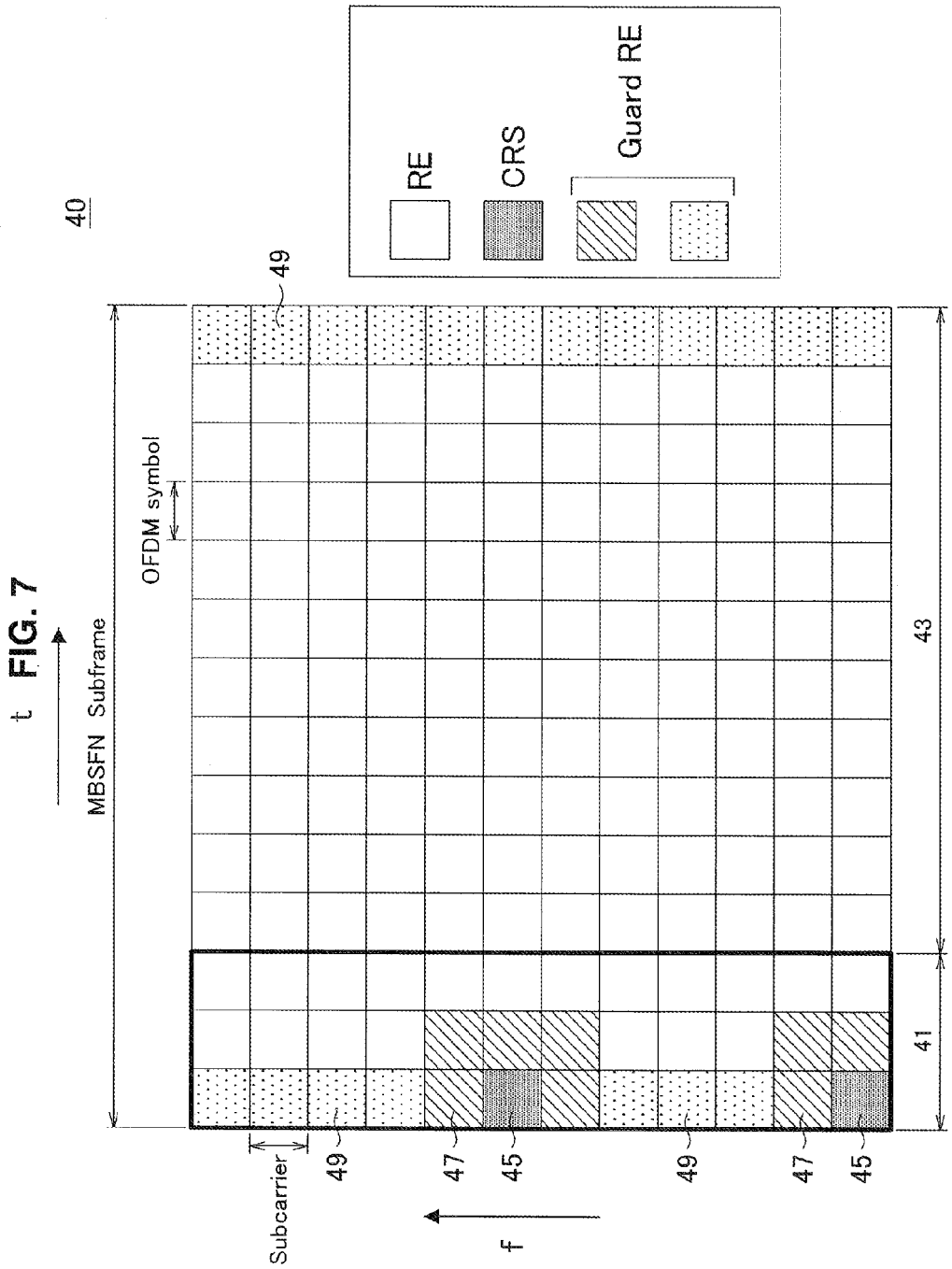
FIG. 7 is an explanatory diagram for describing a second example of a guard region in an MBSFN subframe.

FIG. 7 is an explanatory diagram for describing a second example of a guard region in an MBSFN subframe. Referring to FIG. 7, a region 49 corresponding to a first OFDM symbol and a 14th OFDM symbol among OFDM symbols included in a subframe serves as a guard region. In other words, the secondary system does not use communication resources of the guard region 49 and uses communication resources other than the communication resources of the guard region 49, communication resources of the guard region 47, and communication resources corresponding to the CRS 45.

As the communication resources are used as described above, even when communication resources are not released in a previous or subsequent subframe before or after a subframe in which communication resources are released, it is possible to suppress interference to a signal transmitted by the primary system through the previous or subsequent subframe.

The release of the downlink communication resources of the primary system has been described above, but the release of the uplink communication resources may be implemented by causing the scheduling unit 141 to stop the scheduling. This point will be specifically described below with reference to FIGS. 8 and 9.

Figure 8:
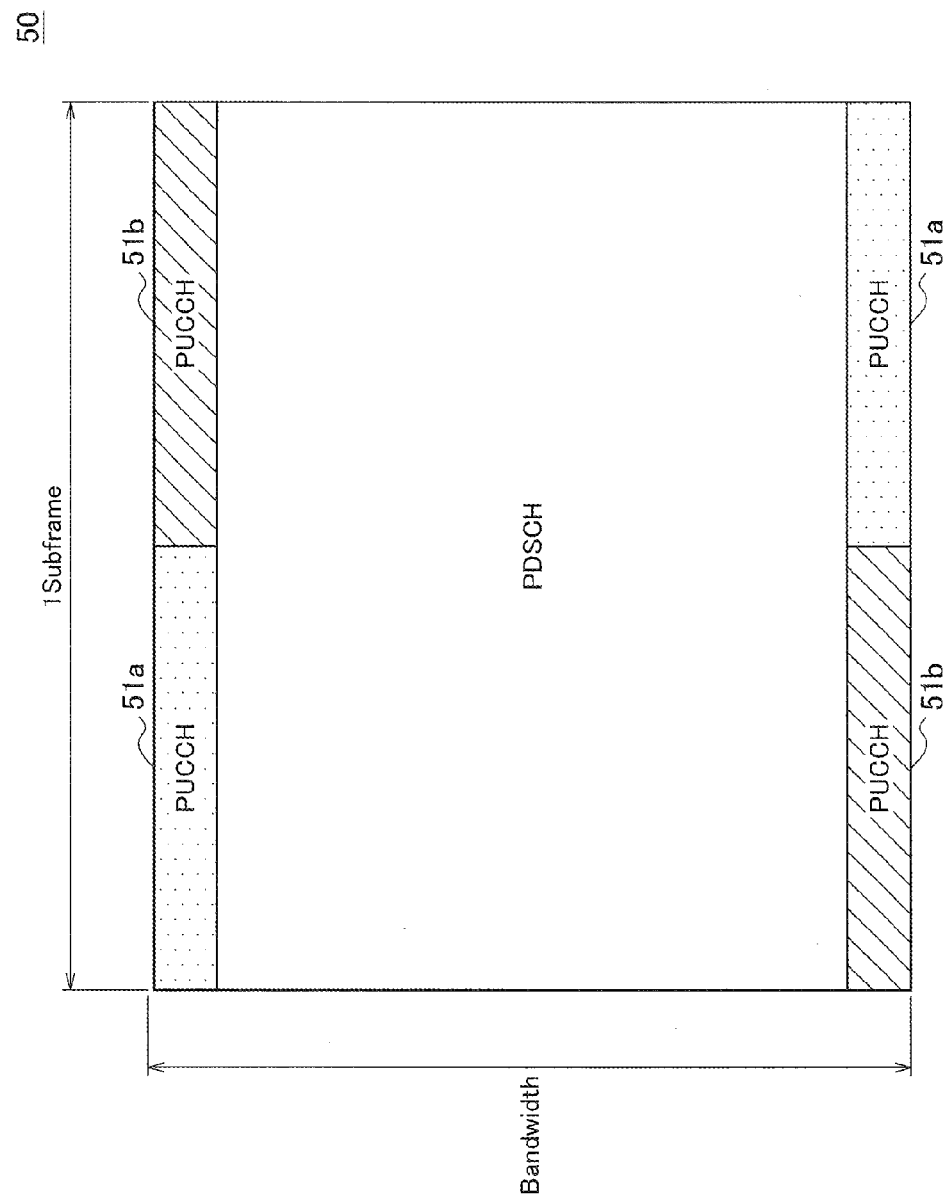
FIG. 8 is an explanatory diagram for describing exemplary communication resources in an uplink subframe.

FIG. 8 is an explanatory diagram for describing exemplary communication resources in an uplink subframe. Referring to FIG. 8, uplink communication resources 50 in one subframe are illustrated. The communication resources 50 are communication resources of one subframe of the entire frequency band. Both end regions of the uplink communication resources 50 in the frequency direction are physical uplink control channels (PUCCH) 51 serving as channels for uplink control signals. The PUCCH is divided into two parts (51a, 51b) and arranged in an obliquely crossed form, and thus effects of both frequency diversity and time diversity are obtained. When the scheduling for the subframe is not performed (that is, the communication resources of the subframe are not allocated to the UE 200), the PUCCH 51 is not included in the communication resources 50. In addition, the CRS is not included in the communication resources 50. Thus, the UE 200 of the primary system can freely use the communication resources 50.

Figure 9:
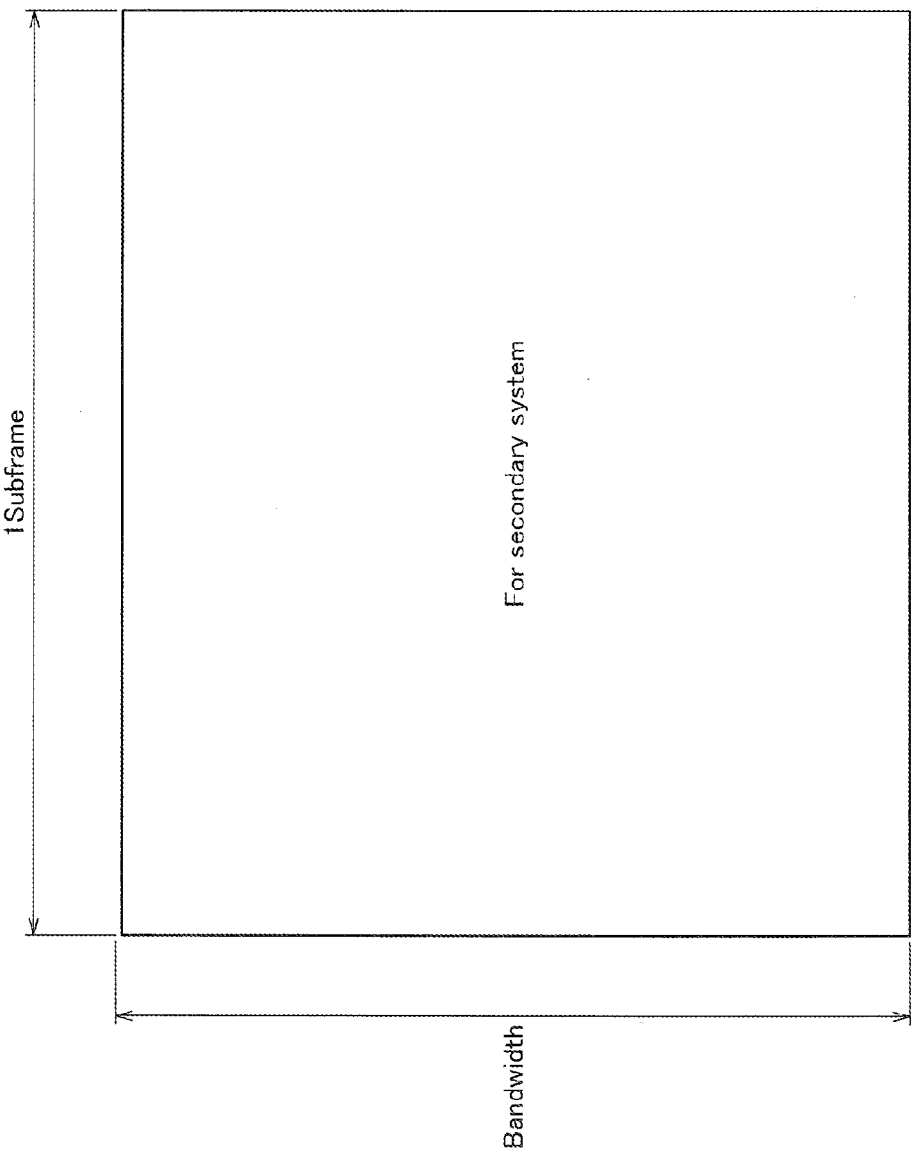
FIG. 9 is an explanatory diagram for describing exemplary released communication resources in an uplink subframe.

FIG. 9 is an explanatory diagram for describing exemplary released communication resources in an uplink subframe. As illustrated in FIG. 9, when uplink communication resources 50 are released, all the communication resources 50 can be used by the secondary system.

Similarly to the downlink, in the case of the uplink, the guard region 49 described above with reference to FIG. 7 may be included in the communication resources 50.

(System Information Generating Unit 147)

The system information generating unit 147 generates the system information of the frequency band of the primary system. For example, the subframe selecting unit 143 includes the identification information of the selected subframe in the system information includes. Further, for example, information for notifying that a subframe (for example, a subframe selected by the subframe selecting unit 143) is an MBSFN subframe may be included in the system information.

<3.3. Configuration of Home eNodeB>

Figure 10:
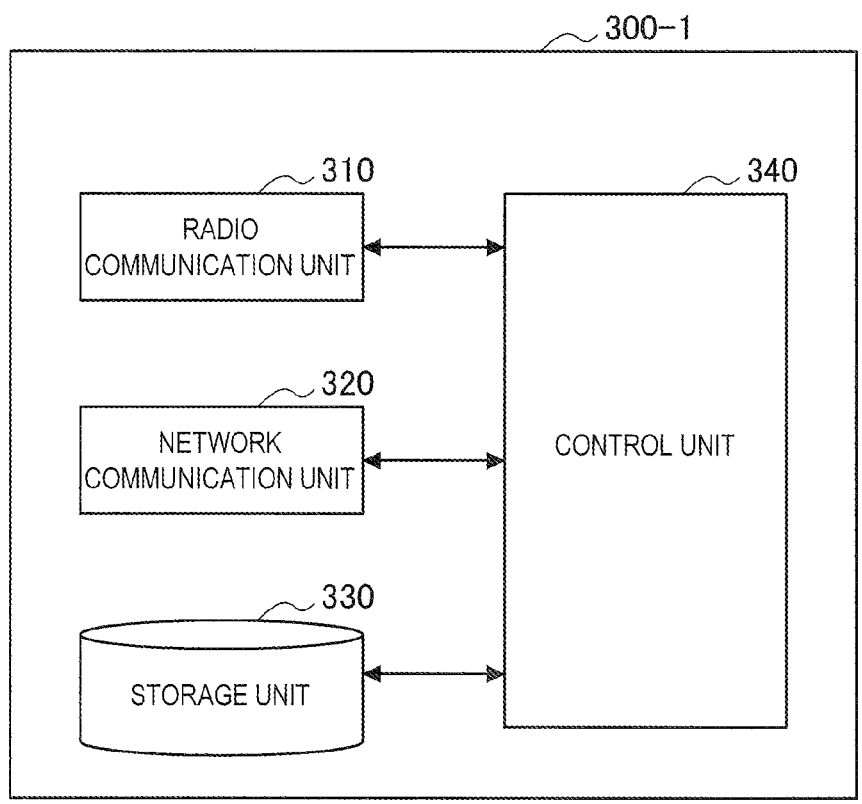
FIG. 10 is a block diagram illustrating an exemplary configuration of a home eNodeB of a secondary system according to the first embodiment.

An exemplary configuration of the home eNodeB 300-1 of the secondary system according to the first embodiment will be described with reference to FIG. 10. FIG. 10 is a block diagram illustrating an exemplary configuration of the home eNodeB 300-1 of the secondary system according to the first embodiment. Referring to FIG. 10, the eNodeB 300-1 includes a radio communication unit 310, a network communication unit 320, a storage unit 330, and a control unit 340.

(Radio Communication Unit 310)

When a subframe in which the frequency band of the primary system is usable by the secondary system is selected by the eNodeB 100-1, the radio communication unit 310 receives the system information of the frequency band including the identification information of the selected subframe. Further, the radio communication unit 310 performs radio communication with the UE 400 using the frequency band within the subframe identified by the identification information according to control of the control unit 340.

Further, for example, the radio communication unit 310 does not use communication resources close to the communication resources of the reference signal (for example, the CRS) in the frequency direction and the time direction within the selected subframe. This has been described above with reference to FIG. 6 in connection with the eNodeB 100-1.

Further, for example, there are also cases in which a subframe directly before the selected subframe is not selected by the eNodeB 100-1. In this case, for example, the radio communication unit 310 does not use the frequency band until a certain period of time elapses from a start point in time of the subframe within the selected subframe. Similarly, there are also cases in which a subframe directly after the selected subframe is not selected by the eNodeB 100-1. In this case, for example, the radio communication unit 310 does not use the frequency band from a certain time before an end point in time of the subframe to the end point in time within the selected subframe. This has been described above with reference to FIG. 7 in connection with the eNodeB 100-1.

(Network Communication Unit 320)

The network communication unit 320 performs communication with other communication nodes. For example, the network communication unit 320 performs communication with the eNodeB 100-1 of the primary system directly or via a certain communication node.

(Storage Unit 330)

The storage unit 330 stores a program and data that are necessary for an operation of the home eNodeB 300-1. For example, the storage unit 330 includes a storage medium such as a hard disk or a semiconductor memory.

(Control Unit 340)

The control unit 340 provides various kinds of functions of the home eNodeB 300-1. For example, the control unit 340 corresponds to a processor such as a CPU or a DSP, and executes a program stored in the storage unit 330 or any other storage medium to provide various kinds of functions.

For example, the control unit 340 identifies a subframe based on the identification information included in the system information of the frequency band of the primary system. The subframe is a subframe in which communication resources are released. Further, the control unit 340 causes the radio communication unit 310 to perform communication using the frequency band within the subframe.

<3.4. Configuration of UE>

Figure 11:
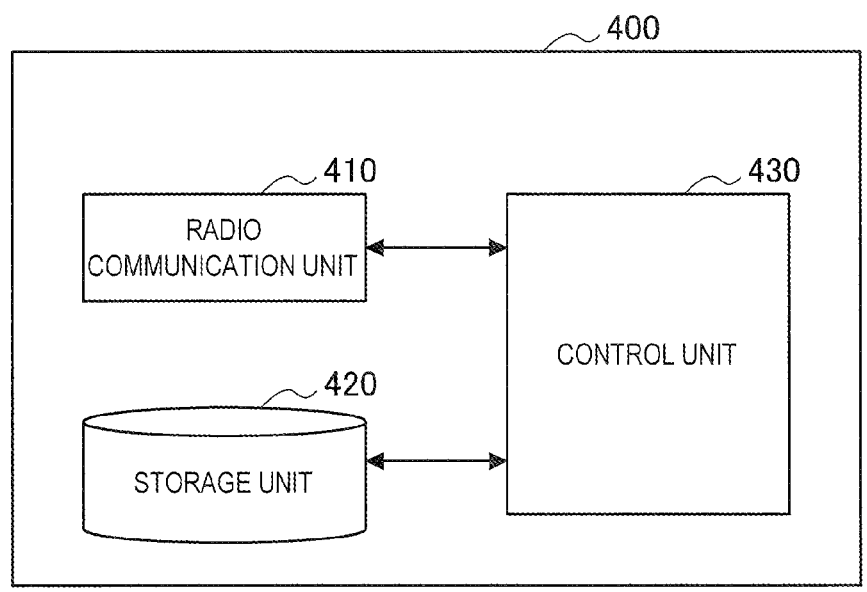
FIG. 11 is a block diagram illustrating an exemplary configuration of a UE of a secondary system according to the first embodiment.

An exemplary configuration of the UE 400 of the secondary system according to the first embodiment will be described with reference to FIG. 11. FIG. 11 is a block diagram illustrating an exemplary configuration of the UE 400 of the secondary system according to the first embodiment. Referring to FIG. 11, the UE 400 includes a radio communication unit 410, a storage unit 420, and a control unit 430.

(Radio Communication Unit 410)

The radio communication unit 410 performs radio communication with the home eNodeB 300-1 using the frequency band within the selected subframe when a subframe in which the frequency band of the primary system is usable by the secondary system is selected by the eNodeB 100-1.

Further, similarly to the home eNodeB 300-1, for example, the radio communication unit 410 does not use communication resources close to the communication resources of the reference signal (for example, the CRS) in the frequency direction and the time direction within the selected subframe.

Further, for example, there are also cases in which a subframe directly before the selected subframe is not selected by the eNodeB 100-1. In this case, similarly to the home eNodeB 300-1, for example, the radio communication unit 410 does not use the frequency band until a certain period of time elapses from a start point in time of the subframe within the selected subframe. Similarly, there are also cases in which a subframe directly after the selected subframe is not selected by the eNodeB 100-1. In this case, similarly to the home eNodeB 300-1, for example, the radio communication unit 410 does not use the frequency band from a certain time before an end point in time of the subframe to the end point in time within the selected subframe.

(Storage Unit 420)

The storage unit 420 stores a program and data that are necessary for an operation of the UE 400. For example, the storage unit 420 includes a storage medium such as a hard disk or a semiconductor memory.

(Control Unit 430)

The control unit 430 provides various kinds of functions of the UE 400. For example, the control unit 430 corresponds to a processor such as a CPU or a DSP, and executes a program stored in the storage unit 430 or any other storage medium to provide various kinds of functions.

For example, the control unit 430 causes the radio communication unit 410 to perform communication using the frequency band within the subframe identified by the identification information included in the system information according to control by the home eNodeB 300-1. The subframe is a subframe in which communication resources are released.

<3.5. Processing Flow>

Figure 12:
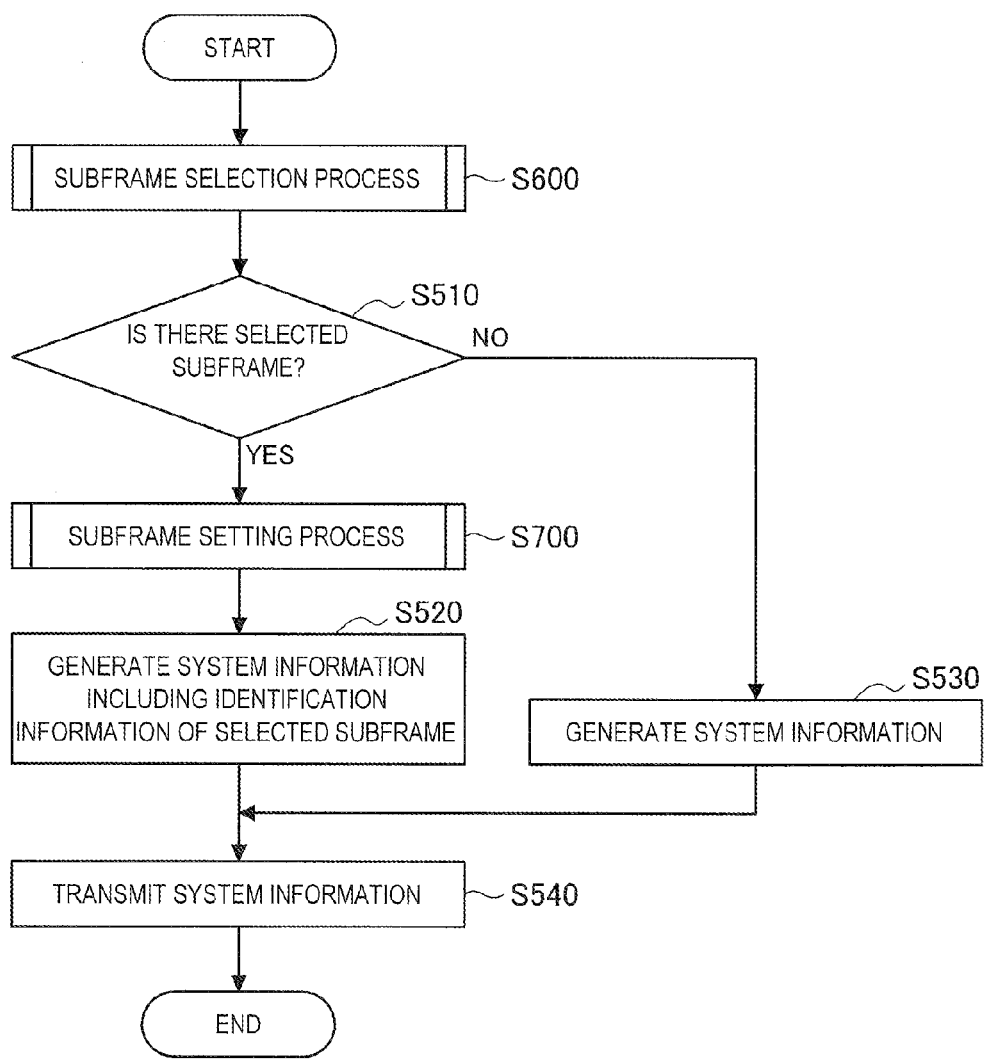
FIG. 12 is a flowchart illustrating an exemplary communication control process according to the first embodiment.

Next, an exemplary communication control process according to the first embodiment will be described with reference to FIGS. 12 to 15. FIG. 12 is a flowchart illustrating an exemplary communication control process according to the first embodiment.

First, in step S600, the subframe selecting unit 143 performs a subframe selection process. In other words, the subframe selecting unit 143 selects a subframe in which the frequency band is usable by the secondary system. The subframe selection process will be described later in detail.

Then, in step S510, the subframe selecting unit determines whether or not there is a selected subframe. When there is a selected subframe, the process proceeds to step S700. Otherwise, the process proceeds to step S530.

In step S700, the scheduling unit 141 and the subframe setting unit 145 perform a subframe setting process. Here, the subframe setting unit 145 sets the selected subframe as a certain type of subframe that is not used for downlink unicast transmission. The subframe setting process will be described later in detail.

In step S520, the system information generating unit 147 generates the system information of the frequency band of the primary system. The system information includes the identification information of the subframe selected by the subframe selecting unit 143.

In step S530, the system information generating unit 147 generates the system information of the frequency band of the primary system.

In step S540, the radio communication unit 110 transmits the system information of the frequency band of the primary system. Then, the process ends.

(Subframe Selection Process)

Next, the subframe selection process (step S600) will be described with reference to FIGS. 13 and 14.

Case in which FDD is Employed

Figure 13:
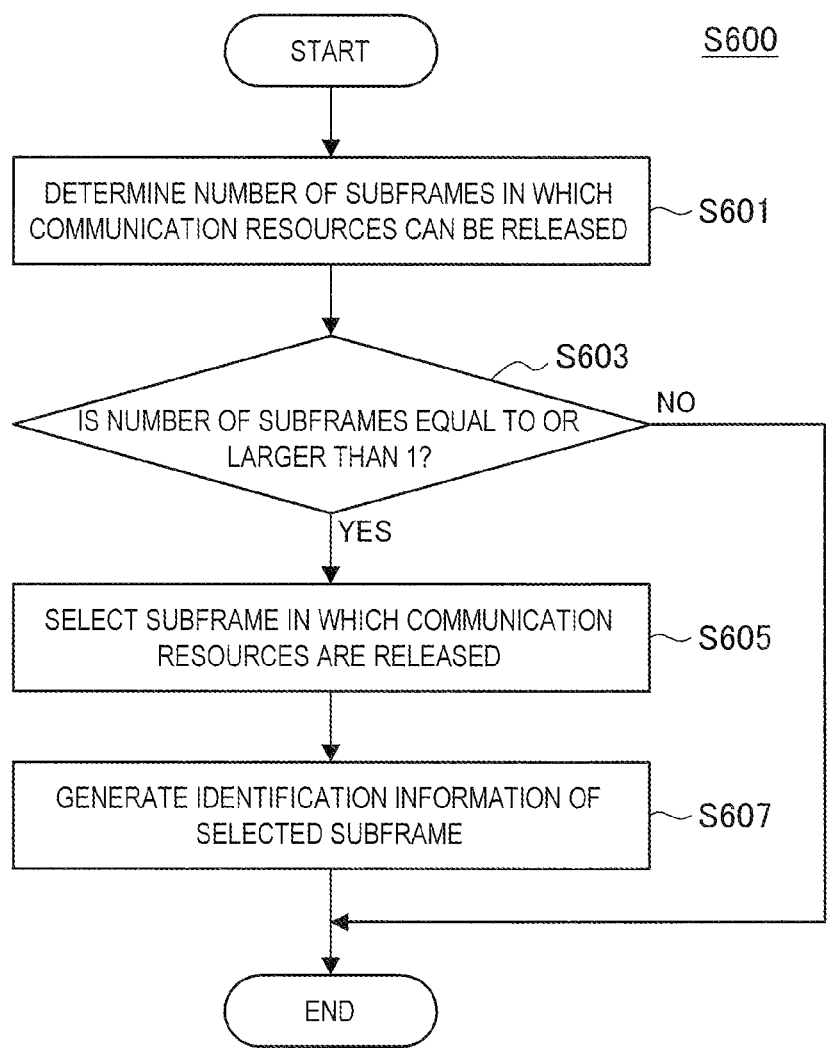
FIG. 13 is a flowchart illustrating an exemplary schematic flow of a subframe selection process (when an FDD is employed) according to the first embodiment.

First, FIG. 13 is a flowchart illustrating an exemplary schematic flow of the subframe selection process (when FDD is employed) according to the first embodiment.

In step S601, the subframe selecting unit 143 determines the number of subframes in which communication resources can be released among 10 subframes included in the radio frame based on the utilization state of the frequency band. Here, for example, the utilization state of the frequency band refers to the number of UEs that are RRC_Connected to the eNodeB or uplink and downlink traffic states of the UE in the RRC_Connected state. Then, for example, a subframe in which the number of UEs or a traffic volume is small can be released is determined. Instead of the technique of determining a traffic volume through a single subframe, it may be determined that a target subframe can be released even when it is possible to migrate traffic of a certain subframe to another subframe, that is, even when it is possible to assimilably migrate target traffic to a subframe other than a target subframe. More specifically, it is a case in which there is no problem even when the scheduler mounted in the MAC layer of the eNodeB does not perform an allocation to the subframe.

Then, in step S603, the subframe selecting unit 143 determines whether or not the number of subframes in which communication resources can be released is one or more (that is, whether or not there is a subframe in which communication resources can be released). When there are one or more subframes, the process proceeds to step S605. Otherwise, the process ends.

In step S605, the subframe selecting unit 143 selects one or more subframes in which communication resources are released (that is, one or more subframes in which the frequency band is usable by the secondary system). Then, in step S607, the subframe selecting unit 143 generates the identification information of the selected subframe. Then, the process ends.

Case in which TDD is Employed

Figure 14:
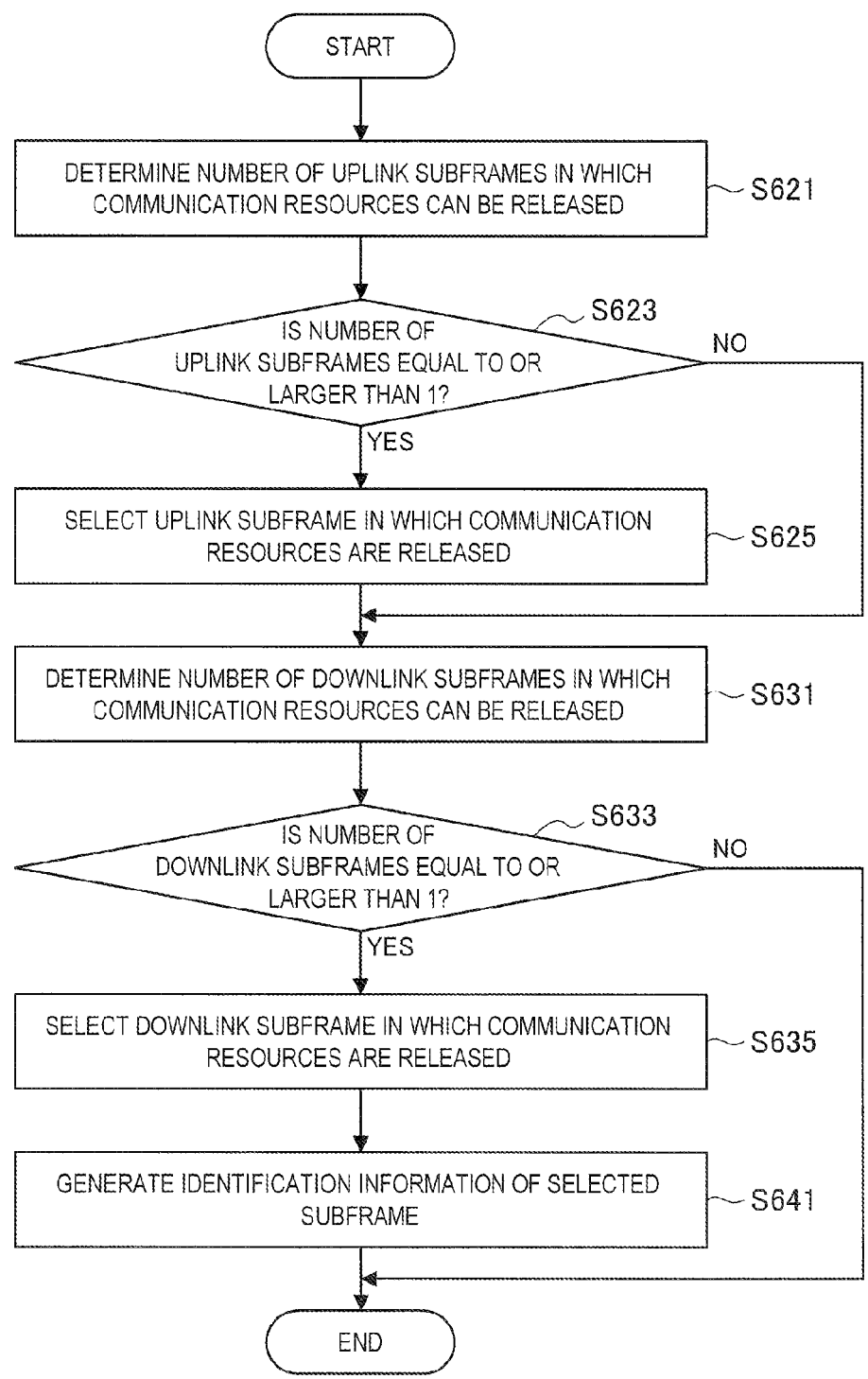
FIG. 14 is a flowchart illustrating an exemplary schematic flow of a subframe selection process (when a TDD is employed) according to the first embodiment.

Next, FIG. 14 is a flowchart illustrating an exemplary schematic flow of the subframe selection process (when TDD is employed) according to the first embodiment.

In step S621, the subframe selecting unit 143 determines the number of uplink subframes in which communication resources can be released among uplink subframes included in the radio frame based on the utilization state of the frequency band of the uplink subframe.

Then, in step S623, the subframe selecting unit 143 determines whether or not there are one or more uplink subframes in which communication resources can be released. When there are one or more uplink subframes, the process proceeds to step S625. Otherwise, the process proceeds to step S631.

In step S625, the subframe selecting unit 143 selects one or more uplink subframes in which communication resources are released.

In step S631, the subframe selecting unit 143 determines the number of downlink subframes in which communication resources can be released among downlink subframes included in the radio frame based on the utilization state of the frequency band of the downlink subframe.

Then, in step S633, the subframe selecting unit 143 determines one or more downlink subframes in which communication resources can be released. When there are one or more downlink subframes, the process proceeds to step S635. Otherwise, the process ends.

In step S635, the subframe selecting unit 143 selects one or more downlink subframes in which communication resources are released.

In step S641, the subframe selecting unit 143 generates identification information of the selected subframes (the uplink subframe and the downlink subframe). Then, the process ends.

(Subframe Setting Process)

Figure 15:
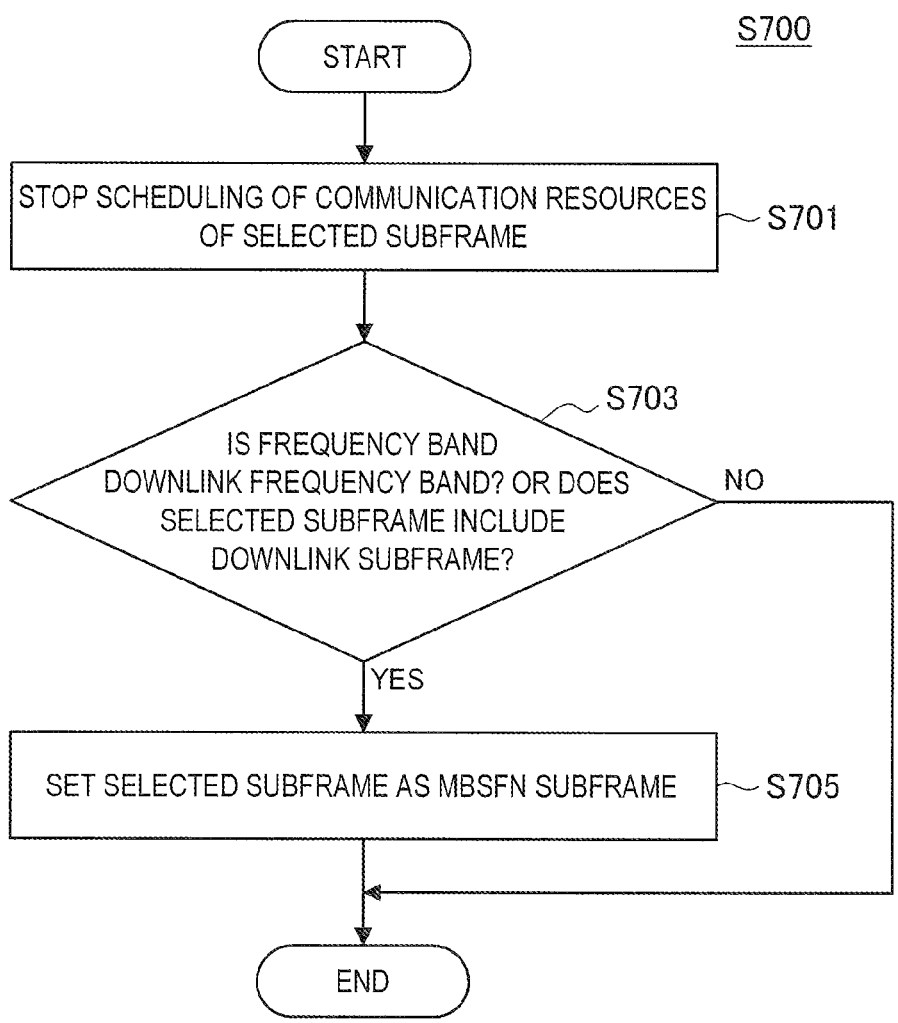
FIG. 15 is a flowchart illustrating an exemplary schematic flow of a subframe setting process according to the first embodiment.

Next, the subframe setting process (step S700) will be described with reference to FIG. 15. FIG. 15 is a flowchart illustrating an exemplary schematic flow of the subframe setting process according to the first embodiment.

In step S701, the scheduling unit 141 stops scheduling of the communication resources of the selected subframe (that is, does not perform scheduling).

Then, in step S703, the subframe setting unit 145 determines whether or not the frequency band is the downlink frequency band (when FDD is employed) or whether or not the selected subframe is the downlink subframe. When the determination result is Yes, the process proceeds to step S705. Otherwise, the process ends.

In step S705, the subframe setting unit 145 sets the selected subframe as an MBSFN subframe. Further, when the primary system employs TDD and both the downlink subframe and the uplink subframe are selected, the MBSFN subframe is set only for the downlink subframe.

<3.6. Modified Example>

Next, a modified example of the first embodiment will be described. In the present modified example, the primary system is a radio communication system of a TDD scheme. Further, the primary system sets the selected subframe as an uplink subframe. As described above, as the selected subframe is the uplink subframe, all control signals can be omitted in the subframe. Thus, the secondary system can use more communication resources.

(Subframe Setting Unit 145)

The subframe setting unit 145 sets the selected subframe as a certain type of subframe that is not used for downlink unicast transmission. Particularly, in the present modified example, the subframe setting unit 145 sets the selected subframe as an uplink subframe. More specifically, for example, when the subframe previously selected by the subframe selecting unit 143 is the downlink subframe of the primary system, the subframe setting unit 145 sets the selected subframe as the uplink subframe. Alternatively, the subframe setting unit 145 may set several subframes among the subframes in the radio frame as the uplink subframe, and the subframe selecting unit 143 may select the subframes set as the uplink subframe.

More specifically, for example, the subframe setting unit 145 changes the TDD configuration such that the number of downlink subframes decreases, and the number of uplink subframes increases. For example, the TDD configuration may be changed such that the link direction of a specific subframe changes from the downlink to the uplink.

(Subframe Setting Process)

Figure 16:
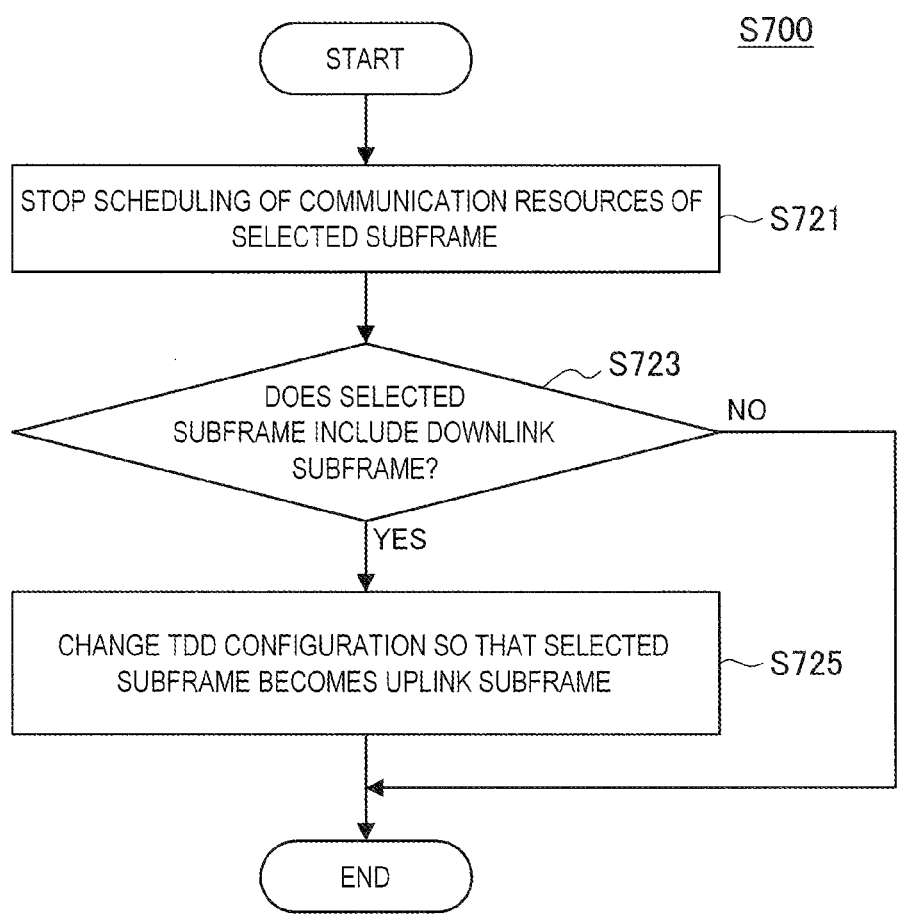
FIG. 16 is a flowchart illustrating an exemplary schematic flow of a subframe setting process according to a modified example of the first embodiment.

The subframe setting process (step S700) according to the present modified example will be described with reference to FIG. 16. FIG. 16 is a flowchart illustrating an exemplary schematic flow of the subframe setting process according to the modified example of the first embodiment.

In step S721, the scheduling unit 141 stops scheduling of the communication resources of the selected subframe.

Then, in step S723, the subframe setting unit 145 determines whether or not the selected subframe includes the downlink subframe. When the selected subframe includes the downlink subframe, the process proceeds to step S725. Otherwise, the process ends.

In step S725, the subframe setting unit 145 changes the TDD configuration such that the selected subframe becomes the uplink subframe. In other words, the subframe setting unit 145 sets the selected subframe as the uplink subframe.

<<4. Second Embodiment>>

<4.1. Overview>

Next, a second embodiment of the present disclosure will be described. When the primary system employs FDD, the communication resources of the downlink frequency band may be released. Further, when the primary system employs TDD, the communication resources of the downlink subframe may be released. In these cases, in the second embodiment, the frequency band is not used within the selected subframe by the secondary system that performs radio communication at the edge of the cell of the primary system. This point will be specifically described below with reference to FIG. 17.

Figure 17:
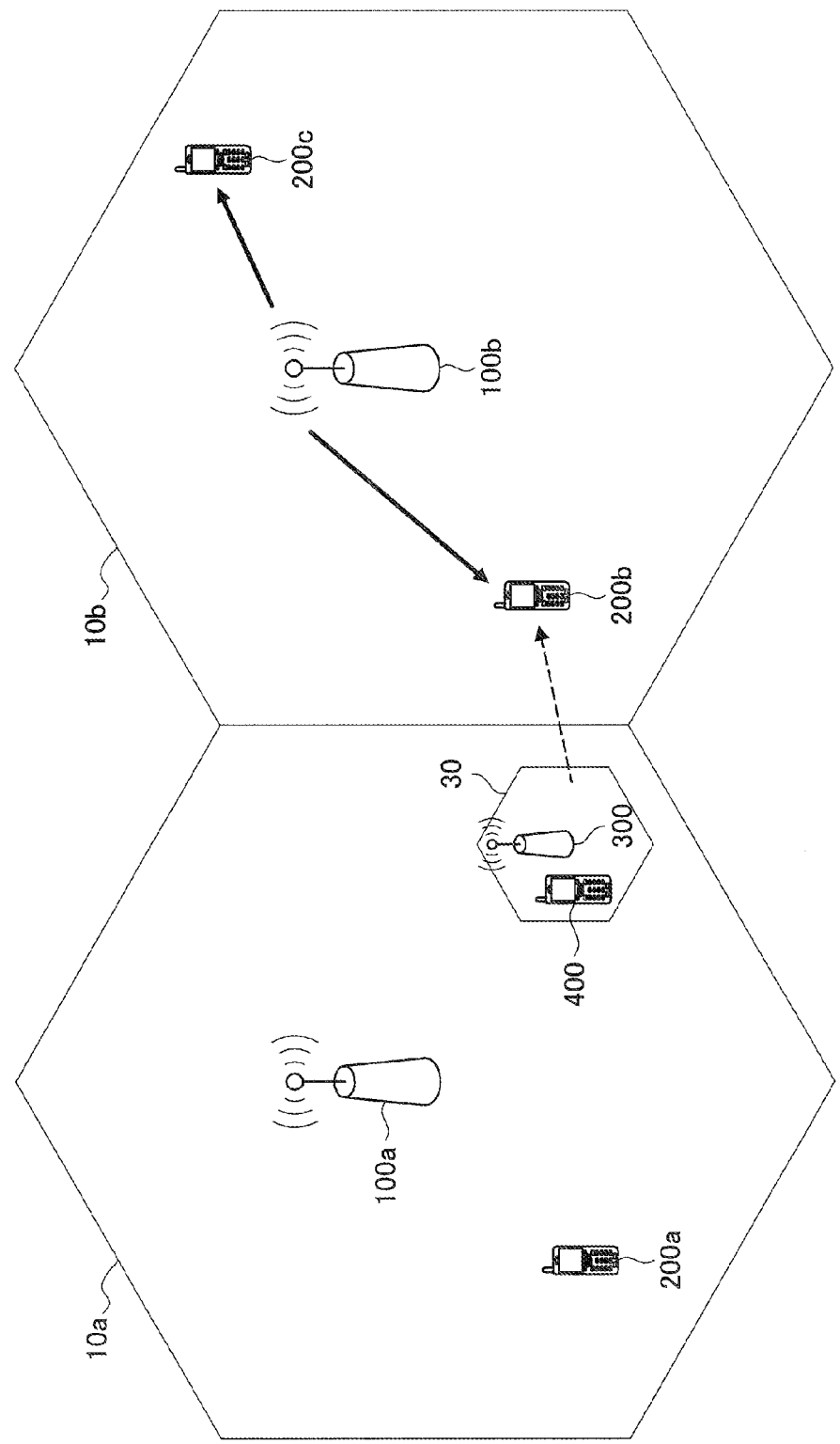
FIG. 17 is an explanatory diagram for describing exemplary interference from a secondary system to a neighboring cell of a primary system.

FIG. 17 is an explanatory diagram for describing exemplary interference from the secondary system to the neighboring cell of the primary system. Referring to FIG. 17, eNodeBs 100a and 100b and UEs 200a, 200b, and 200c of a primary system are illustrated. Further, a home eNodeB 300 and a UE 400 of a secondary system are illustrated. The cell 10a of the eNodeB 100a neighbors a cell 10b of the eNodeB 100b. The secondary system including the home eNodeB 300 and the UE 400 is performing radio communication at the edge of the cell 10.

Here, the primary system is assumed to be a radio communication system of the TDD scheme, and the neighboring cells 10 are assumed to match in the TDD configuration. In this case, for example, the eNodeB 100a releases the communication resources of the downlink subframe to the secondary system in the cell 10a. As a result, the eNodeB 100a and the UE 200a of the primary system do not use the frequency band in the downlink subframe, and the home eNodeB 300 and the UE 400 of the secondary system use the frequency band in the downlink subframe. For example, one of the home eNodeB 300 and the UE 400 transmits a signal to the other. Meanwhile, the eNodeB 100b does not release the communication resources of the subframe to the secondary system in the cell 10b. For this reason, the eNodeB 100b and the UEs 200b and 200c of the primary system use the frequency band in the downlink subframe. For example, the eNodeB 100b transmits a downlink signal to the UE 200b and the UE 200c. In this case, for example, in the UE 200b positioned near the cell 10a, a signal of one of the home eNodeB 300 and the UE 400 performing communication at the cell edge may interfere with the downlink signal transmitted from the eNodeB 100b.

Further, even when the primary system is a radio communication system of the FDD scheme, the above-described interference may occur in the downlink frequency band.

Thus, when the downlink communication resources are released in a certain cell of the primary system, interference to another cell of the primary system neighboring the cell may occur. Further, since it is not clear how close the UE 200 performing communication in the cell 10*b* neighboring the cell 10*a* is to a cell 30 of the secondary system, it is difficult to suppress the interference.

Meanwhile, although the uplink communication resources are released in a certain cell of the primary system, it is possible to suppress interference from a cell neighboring the cell. More specifically, when the uplink communication resources are released, a signal transmitted from one of the home eNodeB 300 and the UE 400 performing communication at the cell edge may interfere with an uplink signal transmitted from the UE 200*b* or the UE 200*c* in the eNodeB 100*b* of the cell 10*b*. Here, the home eNodeB 300 or the UE 400 of the secondary system can observe the reference signal transmitted from the eNodeB 100*b* of the cell 10*b* and predict interference in the eNodeB 100*b*. Thus, in this case, for example, it is possible to suppress the interference through power control in the secondary system.

Thus, in the second embodiment, in order to suppress interference from the secondary system to the primary system, the downlink communication resources are not used by the secondary system performing radio communication at the cell edge of the primary system. This point will be specifically described below with reference to FIG. 18.

Figure 18:
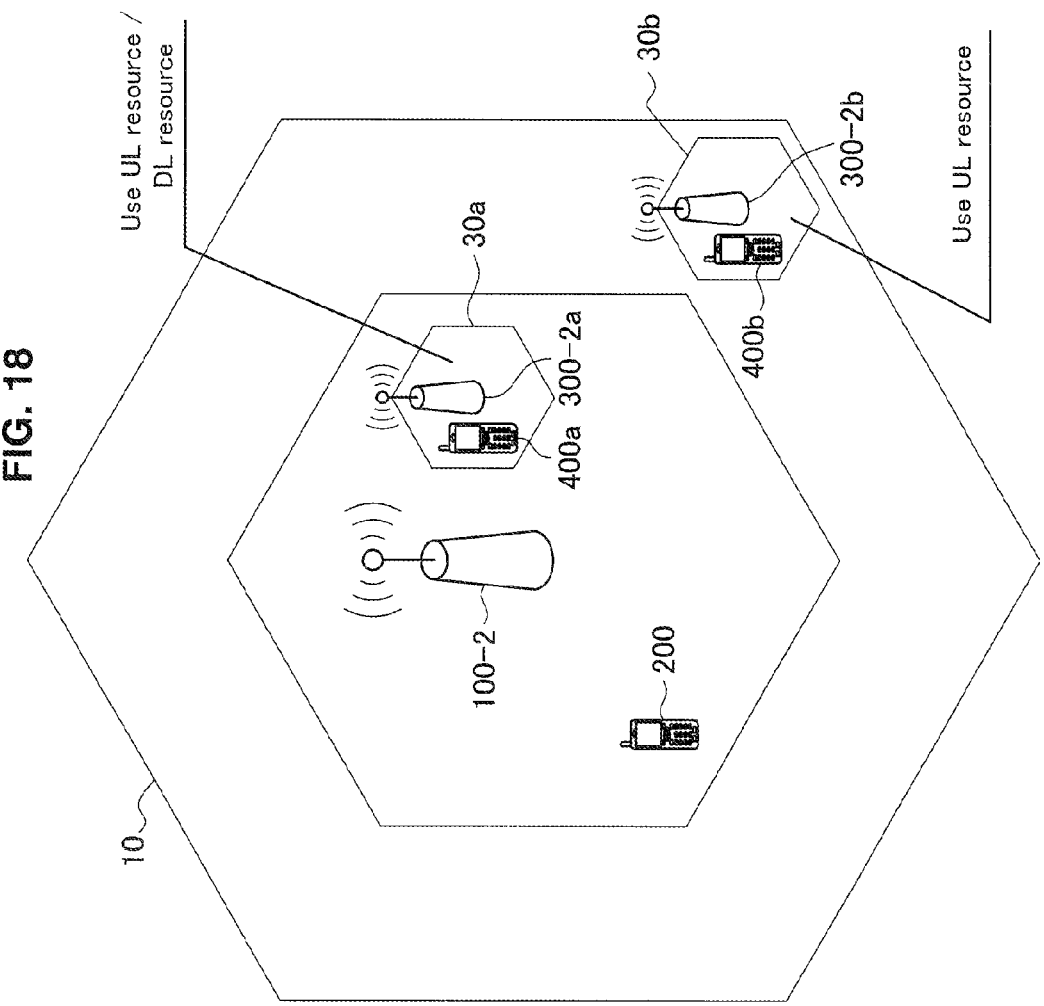
FIG. 18 is an explanatory diagram for describing an exemplary technique of suppressing interference from a secondary system to a neighboring cell of a primary system.

FIG. 18 is an explanatory diagram for describing an exemplary technique of suppressing interference from the secondary system to the neighboring cell of the primary system. Referring to FIG. 18, a secondary system (a home eNodeB 300-2*a* and a UE 400*a*) positioned at a central part of a cell 10 uses uplink communication resources and downlink communication resources of a primary system. Meanwhile, a secondary system (a home eNodeB 300-2*b* and a UE 400*b*) positioned at the edge of the cell 10 uses only the uplink communication resources of the primary system.

As the communication resources usable by the secondary system performing radio communication at the cell edge are restricted as described above, it is possible to suppress interference to the neighboring cell of the primary system.

<4.2. Configuration of eNodeB>

Figure 19:
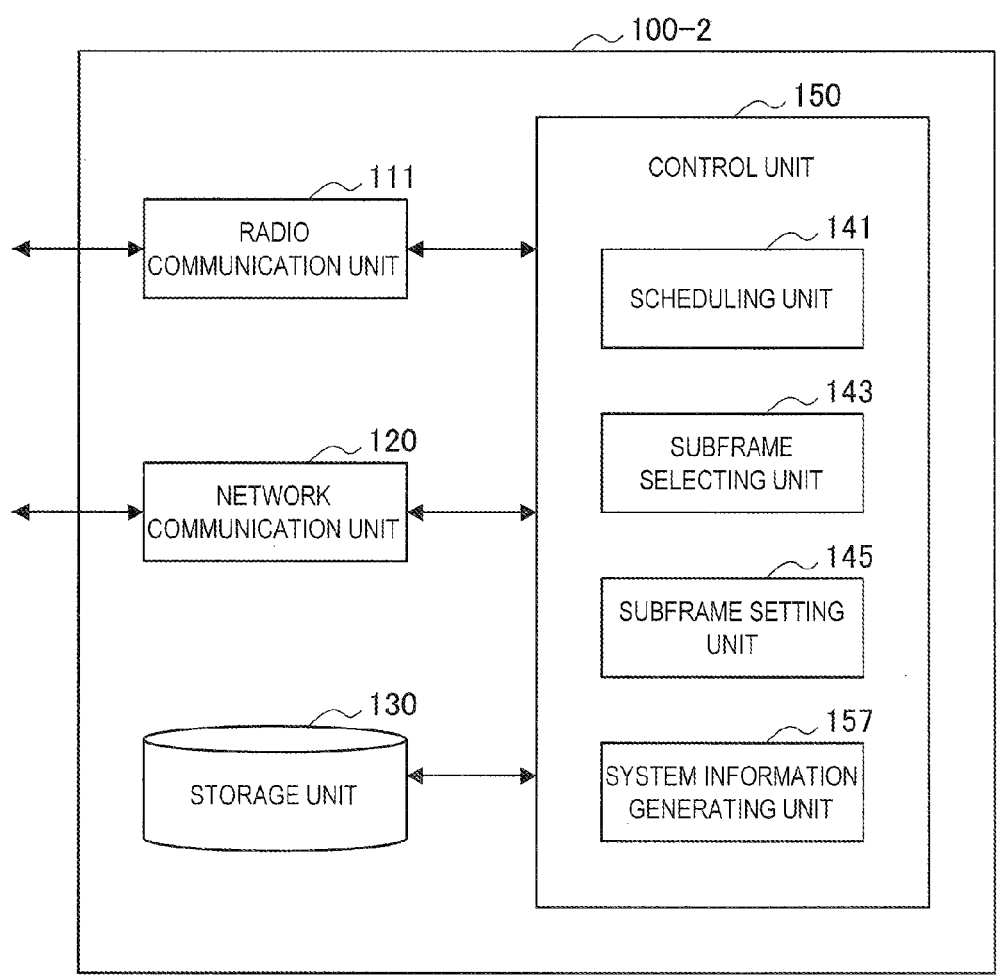
FIG. 19 is a block diagram illustrating an exemplary configuration of an eNodeB of a primary system according to a second embodiment.

An exemplary configuration of an eNodeB 100-2 of the primary system according to the second embodiment will be described with reference to FIG. 19. FIG. 19 is a block diagram illustrating an exemplary configuration of the eNodeB 100-2 of the primary system according to the second embodiment. Referring to FIG. 19, the eNodeB 100-2 includes a radio communication unit 111, a network communication unit 120, a storage unit 130, and a control unit 150.

Here, the network communication unit 120 and the storage unit 130 of the second embodiment are not different from those of the first embodiment. In the control unit 150 of the second embodiment, a scheduling unit 141, a subframe selecting unit 143, and a subframe setting unit 145 are not different from those of the first embodiment. Thus, the radio communication unit 111 and a system information generating unit 157 will be described herein.

(Radio Communication Unit 111)

The radio communication unit 111 performs radio communication with the UE 200 of the primary system using the frequency band of the primary system. Further, for example, when a subframe in which the frequency band is usable by the secondary system is selected by the control unit 140 (the subframe selecting unit 143), the radio communication unit 111 transmits the system information of the frequency band including the identification information of the selected subframe. This point is the same as in the radio communication unit 110 of the first embodiment.

Further, a target frequency band may be the downlink frequency band of the primary system, or the selected subframe may be the downlink subframe of the primary system. In this case, the radio communication unit 111 transmits utilization constraint information indicating that the secondary system performing radio communication at the cell edge of the primary system is not allowed to use the frequency band in the selected subframe. As the utilization constraint information is transmitted as described above, a notification indicating that the downlink communication resources are unusable can be given to the secondary system performing radio communication at the cell edge of the primary system. As a result, it is possible to prevent the frequency band from being used within the selected subframe by the secondary system performing radio communication at the cell edge of the primary system. As a result, interference to the neighboring cell of the primary system is suppressed.

Further, for example, the radio communication unit 111 transmits the system information including the utilization constraint information. In other words, the utilization constraint information is transmitted as part of the system information. Through this transmission, similarly to the identification information of a subframe, the secondary system (for example, the home eNodeB 300-2) can easily check the utilization constraint information and can also check the utilization constraint information immediately after checking the identification information of a subframe.

(System Information Generating Unit 157)

The system information generating unit 147 generates the system information of the frequency band of the primary system. For example, the system information includes the identification information of the subframe selected by the subframe selecting unit 143. Further, for example, the system information may include information for notifying that the subframe (for example, the subframe selected by the subframe selecting unit 143) is an MBSFN subframe. This point is the same as in the system information generating unit 147 of the first embodiment.

Further, when the target frequency band is the downlink frequency band of the primary system or when the selected subframe is the downlink subframe of the primary system, the system information generating unit 147 generates the system information including the utilization constraint information.

<4.3. Configuration of Home eNodeB>

Figure 20:
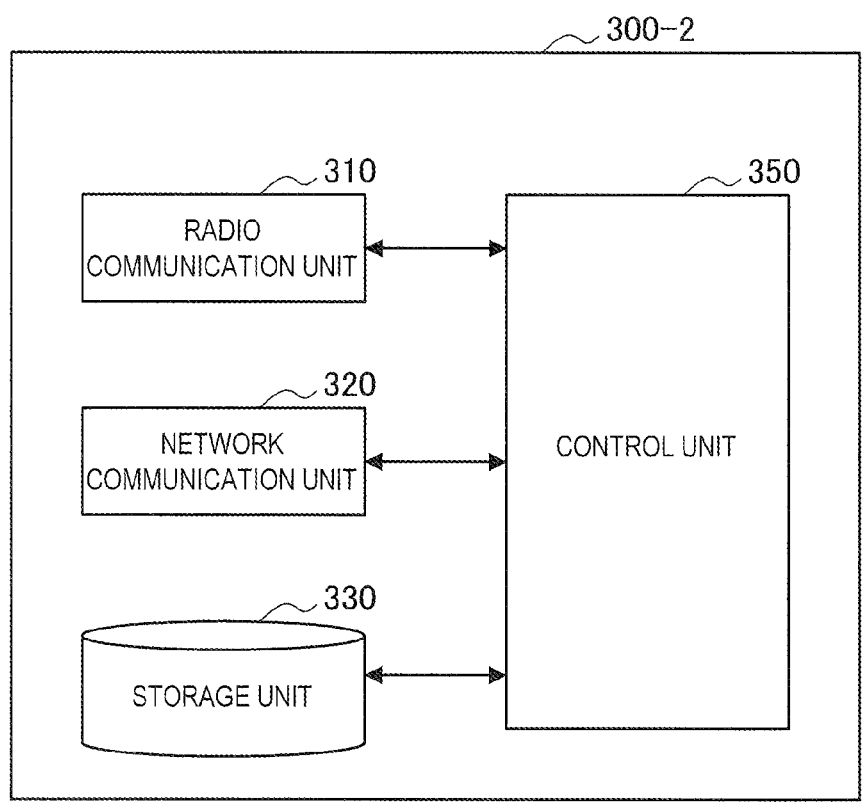
FIG. 20 is a block diagram illustrating an exemplary configuration of an eNodeB of a secondary system according to the second embodiment.

An exemplary configuration of a home eNodeB 300-2 of the secondary system according to the second embodiment will be described with reference to FIG. 20. FIG. 20 is a block diagram illustrating an exemplary configuration of the home eNodeB 300-2 of the secondary system according to the second embodiment. Referring to FIG. 20, the home eNodeB 300-2 includes a radio communication unit 310, a network communication unit 320, a storage unit 330, and a control unit 350.

Here, the radio communication unit 310, the network communication unit 320, and the storage unit 330 of the second embodiment are not different from those of the first embodiment. Thus, the control unit 350 will be described herein.

(Control Unit 350)

The control unit 350 provides various kinds of functions of the home eNodeB 300-1. For example, the control unit 350 identifies a subframe based on the identification information included in the system information of the frequency band of the primary system. The subframe is a subframe in which communication resources are released. Further, the control unit 350 causes the radio communication unit 310 to perform communication using the frequency band within the subframe. This point is the same as in the control unit 340 of the first embodiment.

Further, for example, the home eNodeB 300-2 and the UE 400 perform radio communication at the edge of the cell 10. Furthermore, for example, the target frequency band may be the downlink frequency band of the primary system, or the selected subframe may be the downlink subframe of the primary system. In this case, the control unit 350 controls the radio communication unit 310 such that the frequency band is not used within the selected subframe. More specifically, although the identification information of the subframe has been acquired, when the utilization constraint information of the subframe has also been acquired, the control unit 350 controls the radio communication unit 310 such that the frequency band is not used within the selected subframe.

As a result of this control, it is possible to prevent the frequency band from being used within the selected subframe by the secondary system performing radio communication at the cell edge of the primary system. As a result, interference to the neighboring cell of the primary system is suppressed.

<4.4. Processing Flow>

Figure 21:
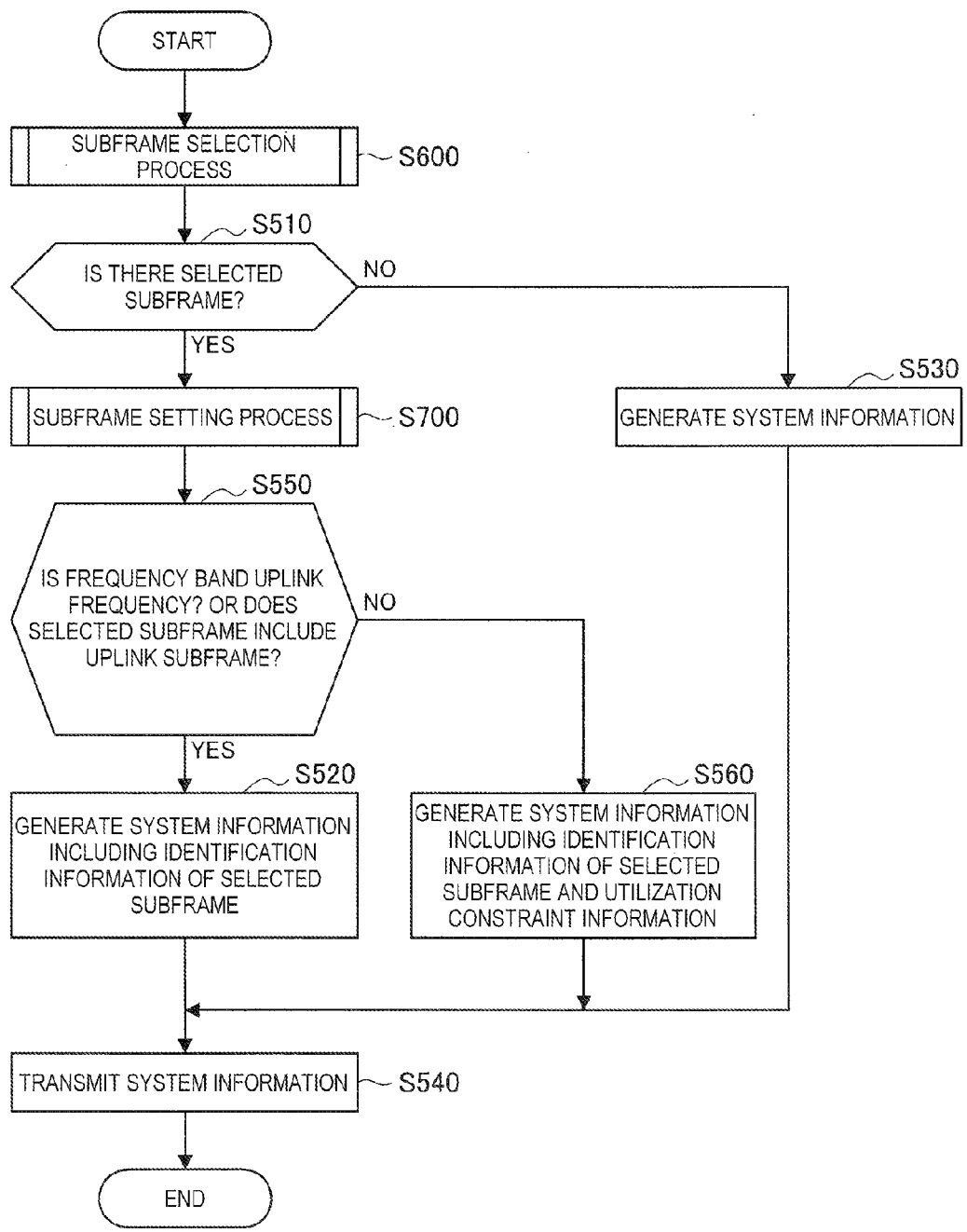
FIG. 21 is a flowchart illustrating an exemplary schematic flow of a communication control process of an eNodeB side according to the second embodiment.
Figure 22:
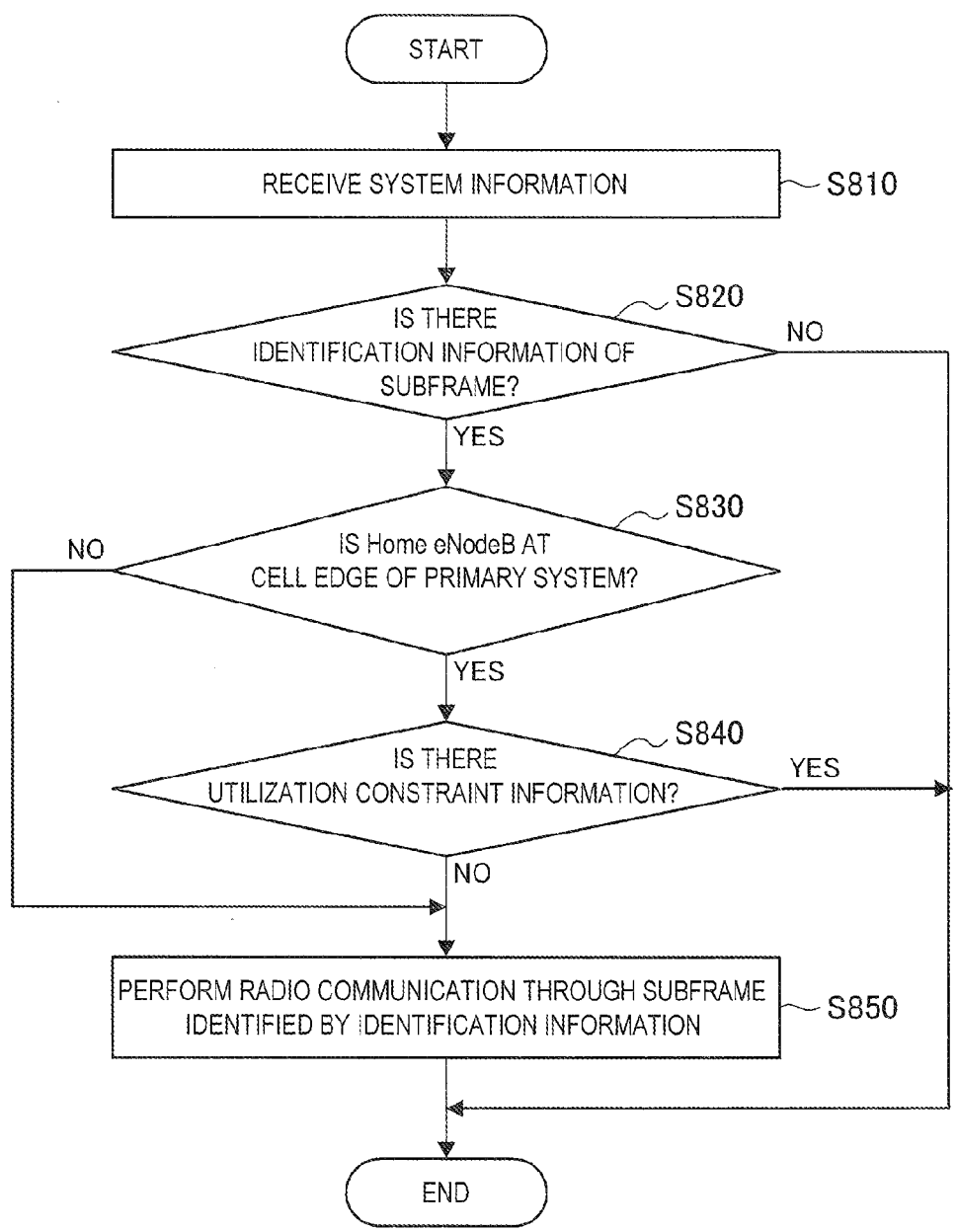
FIG. 22 is a flowchart illustrating an exemplary schematic flow of a communication control process of a home eNodeB side according to the second embodiment.

Next, an exemplary communication control process according to the second embodiment will be described with reference to FIGS. 21 and 22. First, processing of the primary system side will be described. FIG. 21 is a flowchart illustrating an exemplary schematic flow of a communication control process of the eNodeB side according to the second embodiment.

Here, the description will proceed in connection with steps S550 and S560 which are differences between the exemplary communication control process of the first embodiment described above with reference to FIG. 12 and the exemplary communication control process of the second embodiment.

In step S550, the system information generating unit 157 determines whether or not the target frequency band is the uplink frequency band or whether or not the selected subframe is the uplink subframe. When the determination result is Yes, the process proceeds to step S520.

In step S560, the system information generating unit 157 generates the system information including the identification information of the selected subframe and the utilization constraint information.

Next, processing of the secondary system side will be described. FIG. 22 is a flowchart illustrating an exemplary schematic flow of a communication control process of the home eNodeB side according to the second embodiment.

In step S810, the radio communication unit 310 receives the system information. Then, in step S820, the control unit 350 determines whether or not identification information of a subframe is included in the system information. When identification information of a subframe is included, the process proceeds to step S830. Otherwise, the process ends.

In step S830, the control unit 350 determines whether or not the home eNodeB 300-2 is at the edge of the cell 10 of the primary system. When the home eNodeB 300-2 is at the edge of the cell 10, the process proceeds to step S840. Otherwise, the process proceeds to step S850.

In step S840, the control unit 350 determines whether or not the utilization constraint information is included in the system information. When the utilization constraint information is included, the process ends. Otherwise, the process proceeds to step S850.

In step S850, the radio communication unit 310 performs radio communication through the subframe identified by the identification information. Then, the process ends.

<<5. Third Embodiment>>
<5.1. Overview>

Next, a third embodiment of the present disclosure will be described. In the third embodiment, the primary system is a radio communication system of the TDD scheme. Further, the primary system selects an uplink subframe immediately before a downlink subframe preferentially over an uplink subframe immediately before an uplink subframe as a subframe in which the frequency band is usable by the secondary system.

Basically, subframes of TDD are arranged according to a downlink transmission timing and an uplink reception timing at an eNodeB side. Thus, practically, the UE receives a downlink signal later than a timing of a subframe, and transmits an uplink signal earlier than a timing of a subframe. This point will be specifically described below with reference to FIG. 23.

Figure 23:
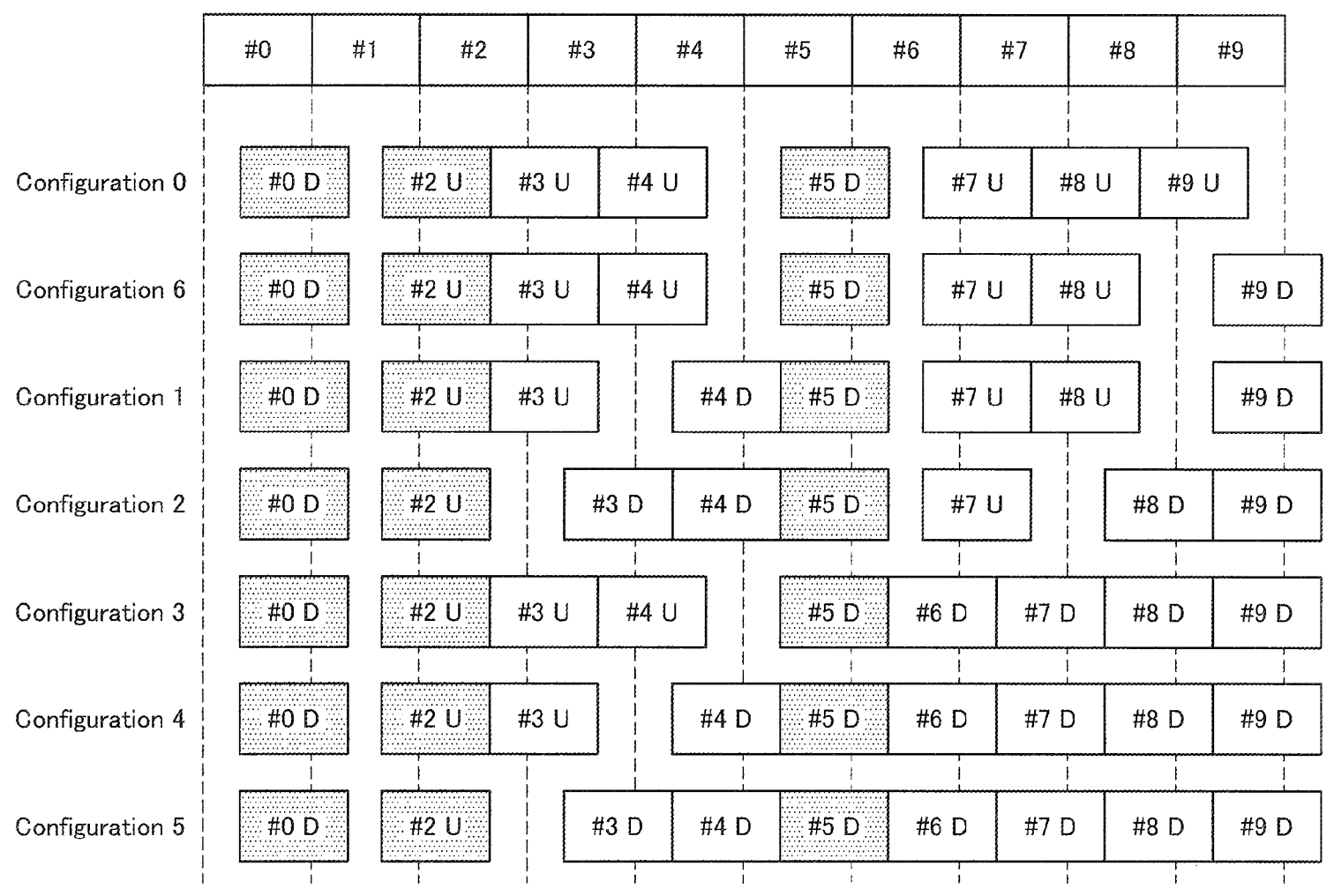

FIG. 23 is an explanatory diagram for describing examples of a downlink reception timing and an uplink transmission timing at the UE side in each TDD configuration. Referring to FIG. 23, a downlink reception timing is later than a timing of a subframe, and an uplink transmission timing is earlier than a timing of a subframe as described above. In FIG. 23, the special subframe inserted for switching from a downlink subframe to an uplink subframe is not illustrated. The special subframe corresponds to the subframe #1 or #6.

Here, focusing on the uplink subframe, there is no interval between an uplink subframe and an immediately subsequent uplink subframe, but there is a large interval between an uplink subframe and an immediately subsequent downlink subframe. Thus, when communication resources of an uplink subframe immediately before a downlink subframe are released, the secondary system can use the communication resources during the interval between the uplink subframe and the immediately subsequent downlink subframe as well as the interval of the uplink subframe. For example, for a configuration 0, when communication resources of an uplink subframe #4 are released, the secondary system can use more communication resources than when communication resources of an uplink subframe #8 are released.

Thus, in the third embodiment, when the uplink subframe is selected, an uplink subframe immediately before a downlink subframe is selected preferentially over an uplink subframe immediately before an uplink subframe. As a result, the secondary system can use more communication resources, and the throughput of the secondary system is improved.

Further, in TDD, a synchronous signal is transmitted through subframes #0, #1, #5, and #6. Thus, communication resources of subframes other than these subframes are likely to be released.

<5.2. Configuration of eNodeB>

Figure 24:
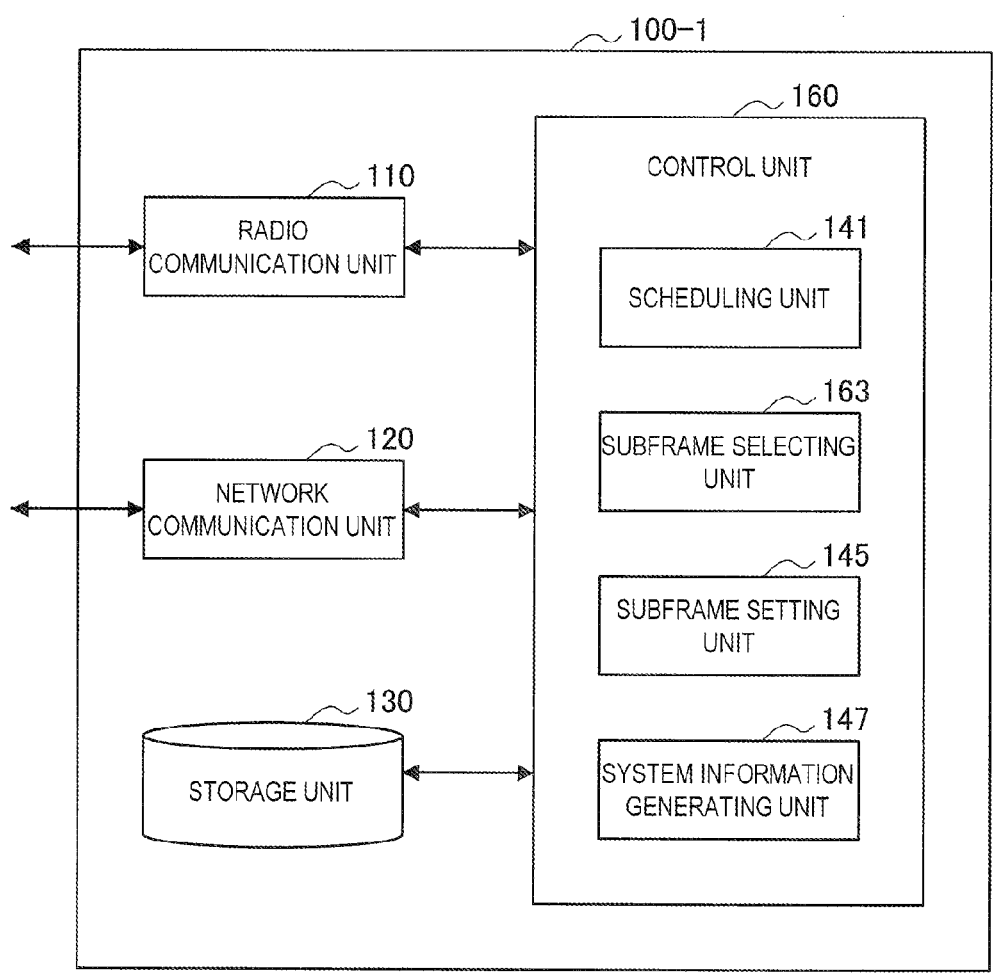
FIG. 24 is a block diagram illustrating an exemplary configuration of an eNodeB 100-3 of a primary system according to a third embodiment.

An exemplary configuration of an eNodeB 100-3 of the primary system according to the third embodiment will be described with reference to FIG. 24. FIG. 24 is a block diagram illustrating an exemplary configuration of an eNodeB 100-3 of the primary system according to the third embodiment. Referring to FIG. 24, the eNodeB 100-3 includes a radio communication unit 110, a network communication unit 120, a storage unit 130, and a control unit 160.

Here, the radio communication unit 110, the network communication unit 120, and the storage unit 130 of the third embodiment are not different from those of the first embodiment. Further, in the control unit 160 of the second embodiment, a scheduling unit 141, a subframe setting unit 145, and a system information generating unit 147 are not different from those of the first embodiment. Thus, the subframe selecting unit 163 will be described herein.

(Subframe Selecting Unit 163)

The subframe selecting unit 163 selects a subframe in which the frequency band is usable by the secondary system. Further, when the primary system is the radio communication system of the TDD scheme, for example, the subframe selecting unit 163 selects an uplink subframe preferentially over a downlink subframe as a subframe in which the frequency band is usable by the secondary system. Further, the subframe selecting unit 163 generates the identification information of the selected subframe. This point is the same as in the subframe selecting unit 143 of the first embodiment.

Further, the subframe selecting unit 163 selects an uplink subframe immediately before a downlink subframe preferentially over an uplink subframe immediately before an uplink subframe as a subframe in which the frequency band is usable by the secondary system. For example, when the TDD configuration is the configuration 0 illustrated in FIGS. 1 and 23, the subframe selecting unit 163 selects the uplink subframes #4 and #9 preferentially over the uplink subframes #2, #3, #7, and #8. As the uplink subframe is selects as described above, the secondary system can use more communication resources.

<5.3. Processing Flow>

Next, an exemplary subframe selection process according to the third embodiment will be described with reference to FIG. 25. An overall communication control process according to the third embodiment is similar to the communication control process of the first embodiment described above with reference to FIG. 12.

Figure 25:
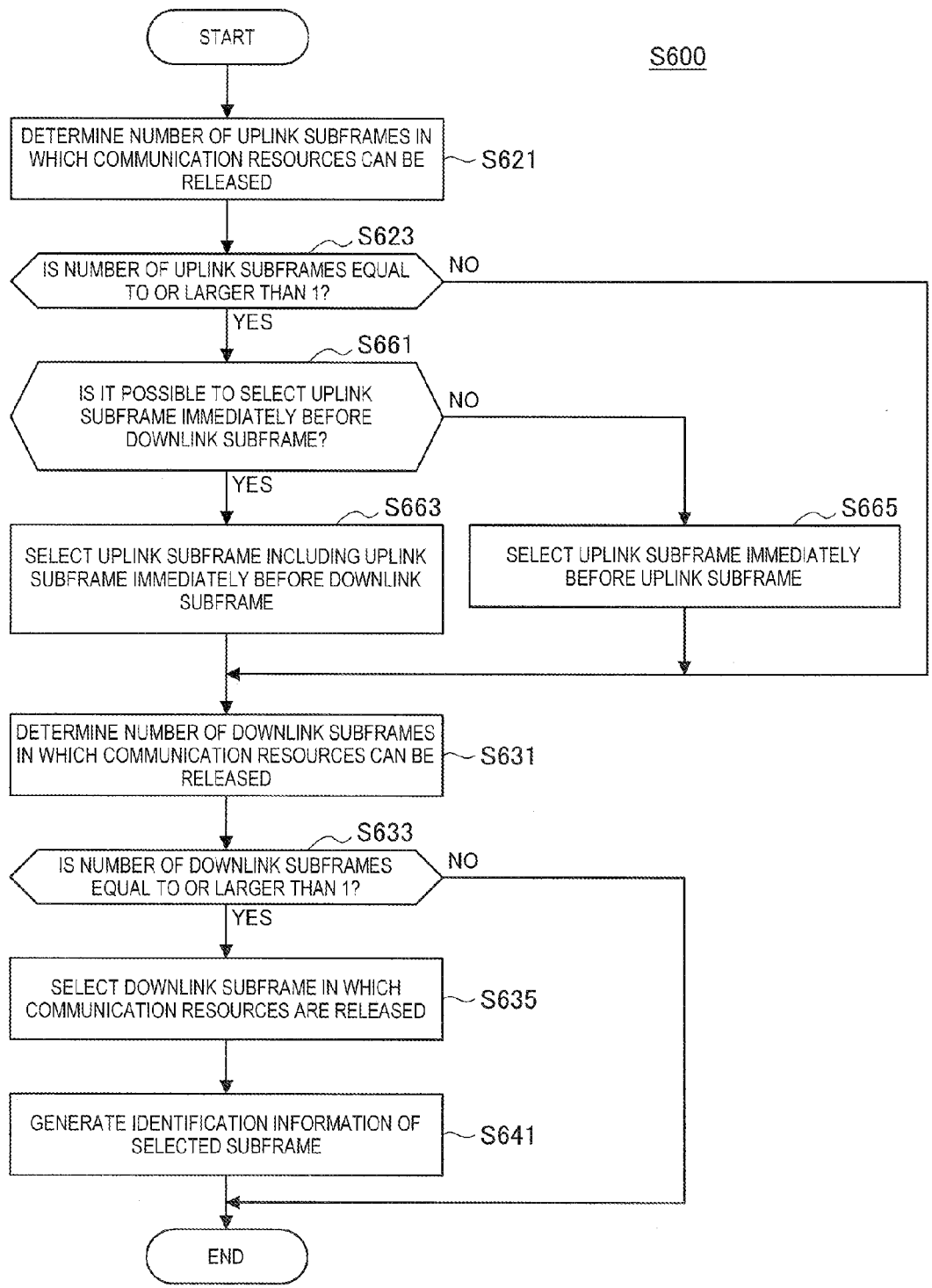
FIG. 25 is a flowchart illustrating an exemplary schematic flow of a subframe selection process according to the third embodiment.

FIG. 25 is a flowchart illustrating an exemplary schematic flow of the subframe selection process according to the third embodiment. Here, the description will proceed with steps S661, S663, and S665 that are differences between the exemplary subframe selection process (when TDD is employed) according to the first embodiment described above with reference to FIG. 14 and the exemplary subframe selection process according to the third embodiment.

In step S661, the subframe selecting unit 163 determines whether or not it is possible to select an uplink subframe immediately before a downlink subframe. When it is possible to select the uplink subframe, the process proceeds to step S663. Otherwise, the process proceeds to step S665.

In step S663, the subframe selecting unit 163 selects one or more uplink subframes including an uplink subframe immediately before a downlink subframe.

In step S665, the subframe selecting unit 163 selects one or more uplink subframes immediately before a downlink subframe.

<<6. Conclusion>>

The respective devices and the communication control processes according to the embodiments of the present disclosure have been described above with reference to FIGS. 1 to 25. According to these embodiments, the eNodeB 100 of the primary system selects a subframe in which the frequency band is usable by the secondary system. Then, the eNodeB 100 of the primary system transmits the system information of the frequency band including the identification information of the selected subframe. As a result, the primary system can efficiently notify of the communication resources in the idle state, and the secondary system can easily check the communication resources.

The eNodeB 100 of the primary system sets the selected subframe as a certain type of subframe that is not used for downlink unicast transmission. Through this setting, the secondary system can use more communication resources within the subframe.

More specifically, for example, the eNodeB 100 of the primary system sets the selected subframe as the MBSFN subframe. Through the setting of the MBSFN subframe, the UE 200 of the primary system does not receive signals other than the CRS 45 of the PDCCH (the region 41) within the subframe. As a result, the secondary system can use communication resources other than communication resources corresponding to the CRS 45 of the PDCCH within the selected subframe. Thus, compared to the technique in which scheduling of the selected subframe is not performed, the secondary system can use more communication resources.

Further, for example, the eNodeB 100 of the primary system sets the selected subframe as the uplink subframe. As the selected subframe is set as the uplink subframe as described above, all control signals within the subframe can be omitted. Thus, the secondary system can use more communication resources.

Further, when the primary system is the radio communication system of the TDD scheme, for example, the eNodeB 100 of the primary system selects the uplink subframe preferentially over the downlink subframe as a subframe in which the frequency band is usable by the secondary system. When the uplink subframe is selected, the secondary system can use more communication resources than when the downlink subframe is selected. Thus, the communication resources can be more effectively used. Further, when the uplink subframe is selected, the primary system need not perform a setting of a subframe. Thus, the load of the primary system can be reduced.

Further, when the target frequency band is the downlink frequency band of the primary system or when the selected subframe is the downlink subframe of the primary system, the frequency band is not used within the selected subframe by the secondary system performing radio communication at the cell edge of the primary system. As communication resources usable by the secondary system performing radio communication at the cell edge are restricted as described above, interference to the neighboring cell of the primary system can be suppressed.

Further, the eNodeB 100 of the primary system selects an uplink subframe immediately before a downlink subframe preferentially over an uplink subframe immediately before an uplink subframe as a subframe in which the frequency band is usable by the secondary system. As the uplink subframe is selected as described above, the secondary system can use more communication resources.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, the secondary system including the home eNodeB and the UE has been described as an example, but the secondary system according to the present disclosure is not limited to this example. The secondary system may be a radio communication system including any other communication device. For example, the secondary system may be any other radio communication system including any base station (or access point) and any terminal apparatus. Further, for example, the secondary system may include a plurality of terminal apparatuses, and the plurality of terminal apparatuses may perform direct communication with one another. Such direct communication is called device to device communication (D2D), and is attracting public attention as a new future cellular technique.

Further, the example in which the home eNodeB in the secondary system processes information such as the identification information of a subframe and the utilization constraint information transmitted from the primary system has been described, but the technique according to the present disclosure is not limited to this example. Any one communication device in the secondary system may process the information such as the identification information of a subframe and the utilization constraint information. For example, the UE may process the information instead of the home eNodeB or together with the home eNodeB.

Further, the example in which the utilization constraint information is transmitted as part of the system information has been described, but the technique according to the present disclosure is not limited to this example. For example, the utilization constraint information may be transmitted by any other technique. For example, the utilization constraint information may be transmitted to the communication device (for example, the home eNodeB) of the secondary system via a network including a wired network.

Further, the example in which the communication resources of one frequency band of the primary system are released has been described, but the technique according to the present disclosure is not limited to this example. Communication resources of each of a plurality of frequency bands of the primary system may be released. In this case, for example, the processing of the above embodiments is executed for each frequency band.

Processing steps in the various types of communication control in the present description do not necessarily have to be performed in the chronological order described in the flowcharts. For example, the processing steps in the various types of communication control may be performed in an order different from the order described as the flowcharts, or may be performed in parallel. As a specific example, the example in which the subframe setting process is performed after the subframe selection process in the communication control process has been described, but the communication control process according to the present disclosure is not limited to this example. For example, in the communication control process, the subframe selection process may be performed after the subframe setting process, or individual steps included in the subframe selection process and individual steps included in the subframe setting process may be performed according to an appropriate order.

Further, it is possible to create a computer program causing hardware such as a CPU, a ROM, and a RAM with which the communication control device of the primary system such as the eNodeB and the communication device of the secondary system such as the home eNodeB and the UE are equipped to execute the same functions as the communication control device and the respective components of the communication device. Further, a storage medium storing the computer program is also provided.

Additionally, the present technology may also be configured as below.

(1)

A communication control device including:

a radio communication unit configured to perform radio communication with a terminal apparatus of a primary system using a frequency band of the primary system; and a selecting unit configured to select a subframe in which the frequency band is usable by a secondary system secondarily using the frequency band, the subframe being a unit of time in radio communication, wherein the radio communication unit transmits system information of the frequency band including identification information of the selected subframe.

(2)

The communication control device according to (1), further including:

a setting unit configured to set the selected subframe as a certain type of subframe that is not used for downlink unicast transmission.

(3)

The communication control device according to (2), wherein the setting unit sets the selected subframe as a multicast-broadcast single frequency network (MBSFN) subframe.

(4)

The communication control device according to (2), wherein the primary system is a radio communication system of a time division duplex scheme, and wherein the setting unit sets the selected subframe as an uplink subframe.

(5)

The communication control device according to any one of (1) to (4), wherein the primary system is a radio communication system of a time division duplex scheme, and wherein the selecting unit selects an uplink subframe preferentially over a downlink subframe as the subframe in which the frequency band is usable by the secondary system.

(6)

The communication control device according to any one of (1) to (5), wherein, within the selected subframe, communication resources close to communication resources of a reference signal in a frequency direction and a time direction are not used by the secondary system.

(7)

The communication control device according to any one of (1) to (6), wherein, when a subframe immediately before the selected subframe is not selected by the selecting unit, the frequency band is not used within the selected subframe by the secondary system until a certain period of time elapses after a start point in time of the subframe, and when a subframe immediately after the selected subframe is not selected by the selecting unit, the frequency band is not used within the selected subframe by the secondary system from a certain period of time before an end point in time of the subframe to the end point in time.

(8)

The communication control device according to any one of (1) to (7), wherein, when the frequency band is a downlink frequency band of the primary system or when the selected subframe is a downlink subframe of the primary system, the frequency band is not used within the selected subframe by the secondary system performing radio communication at a cell edge of the primary system.

(9)

The communication control device according to (8), wherein, when the frequency band is the downlink frequency band of the primary system or when the selected subframe is the downlink subframe of the primary system, the radio communication unit transmits utilization constraint information indicating that the frequency band is unusable within the selected subframe by the secondary system performing radio communication at the cell edge of the primary system.

(10)

The communication control device according to (9), wherein, when the frequency band is the downlink frequency band of the primary system or when the selected subframe is the downlink subframe of the primary system, the radio communication unit transmits the system information including the utilization constraint information.

(11)

The communication control device according to any one of (1) to (10), wherein the primary system is a radio communication system of a time division duplex scheme, and wherein the selecting unit selects an uplink subframe immediately before a downlink subframe preferentially over an uplink subframe immediately before an uplink subframe as the subframe in which the frequency band is usable by the secondary system.

(12)

A communication control method including:

performing radio communication with a terminal apparatus of a primary system using a frequency band of the primary system;

selecting a subframe in which the frequency band is usable by a secondary system secondarily using the frequency band, the subframe being a unit of time in radio communication; and transmitting system information of the frequency band including identification information of the selected subframe.

(13)

A communication device including:

a radio communication unit configured to, when a communication control device performing radio communication with a terminal apparatus of a primary system using a frequency band of the primary system selects a subframe in which the frequency band is usable by a secondary system secondarily using the frequency band, receive system information of the frequency band including identification information of the selected subframe, the subframe being a unit of time in radio communication; and a control unit configured to cause the radio communication unit to perform radio communication using the frequency band within the subframe identified by the identification information.

REFERENCE SIGNS LIST 10 cell of primary system
30 cell of secondary system
100 eNodeB
110, 111 radio communication unit
120 network communication unit
130 storage unit
140, 150, 160 control unit
141 scheduling unit
143, 163 subframe selecting unit
145 subframe setting unit
147, 157 system information generating unit
300 home eNodeB
310 radio communication unit
320 network communication unit
330 storage unit
340, 350 control unit
400 UE
410 radio communication unit
420 storage unit
430 control unit

The invention claimed is:

1. A communication control device comprising:
a radio communication unit configured to perform radio communication with a terminal apparatus of a primary system using a downlink frequency band or an uplink frequency band of the primary system; and
a controller configured to:
select, based on a utilization state of the uplink frequency band by the primary system, a communication resource in the uplink frequency band of the primary system that is not used by the primary system for communication,
wherein the radio communication unit is further configured to transmit to a terminal device in a secondary system, multi-bit identification information identifying the selected communication resource, wherein the multiple bits in the multi-bit identification information specify one of a plurality of predetermined patterns, wherein each of the plurality of predetermined patterns specifies communication resources that may be used by the terminal device in the secondary system when the communication resources are not used by the primary system for communication.

2. The communication control device of claim 1, wherein transmitting the identification information comprises transmitting the identification information in system information.

3. The communication control device of claim 1, wherein the primary system corresponds to a first Long Term Evolution (LTE)-based radio communication system and the secondary system corresponds to a second LTE-based radio communication system.

4. The communication control device of claim 1, wherein a number of bits in the multi-bit identification is less than a number of subframes included in a radio frame in an LTE-based radio communication scheme.

5. A communication control method comprising:
performing radio communication with a terminal apparatus of a primary system using a downlink frequency band or an uplink frequency band of the primary system;
selecting, based on a utilization state of the uplink frequency band by the primary system, a communication resource in which the uplink frequency band of the primary system is not used by the primary system for communication; and
transmitting to a terminal device of a secondary system, multi-bit identification information identifying the selected communication resource, wherein the multiple bits in the multi-bit identification information specify one of a plurality of predetermined patterns, wherein each of the plurality of predetermined patterns specifies communication resources that may be used by the terminal device in the secondary system when the communication resources are not used by the primary system for communication.

6. The communication control method of claim 5, wherein transmitting the identification information comprises transmitting the identification information in system information.

7. The communication control method of claim 5, wherein the primary system corresponds to a first Long Term Evolution (LTE)-based radio communication system and the secondary system corresponds to a second LTE-based radio communication system.

8. The communication control method of claim 5, wherein receiving the identification information comprises receiving the identification information in system information.

9. The communication control method of claim 5, wherein the primary system corresponds to a first Long Term Evolution (LTE)-based radio communication system and the secondary system corresponds to a second LTE-based radio communication system.

10. A communication device comprising:
a radio communication unit of a secondary system configured to receive from a primary system, multi-bit identification information identifying a communication resource, wherein the multiple bits in the multi-bit identification information specify one of a plurality of predetermined patterns of a communication resource in which an uplink frequency band of the primary system is not used by the primary system for communication, wherein each the plurality of predetermined patterns specifies communication resources that may be used by the radio communication unit of the secondary system when the communication resources are not used by the primary system for communication; and
a controller configured to cause the radio communication unit to perform radio communication using the uplink frequency band within the communication resources identified by the multi-bit identification information.

\* \* \* \* \*